US008817641B2

(12) United States Patent
Choi et al.

(10) Patent No.: US 8,817,641 B2
(45) Date of Patent: Aug. 26, 2014

(54) COMMUNICATION TERMINAL, COMMUNICATION DEVICE AND METHODS THEREOF FOR DETECTING AND AVOIDING IN-DEVICE INTERFERENCE

(75) Inventors: Hyung-Nam Choi, Hamburg (DE); Maik Bienas, Braunschweig (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 564 days.

(21) Appl. No.: 13/028,258

(22) Filed: Feb. 16, 2011

(65) Prior Publication Data

US 2012/0207038 A1 Aug. 16, 2012

(51) Int. Cl.
*H04L 1/00* (2006.01)
*H04W 16/14* (2009.01)
*H04W 72/12* (2009.01)

(52) U.S. Cl.
CPC .......... *H04W 16/14* (2013.01); *H04W 72/1215* (2013.01)
USPC ....... 370/252; 370/241; 455/63.1; 455/67.11; 455/115.2

(58) Field of Classification Search
CPC ........... H04J 3/14; H04L 43/50; H04L 43/00; H04L 43/08; H04L 1/0026; H04B 17/00; H04B 17/003; H04B 1/1027; H04B 17/0042; H04B 1/0475; H04W 28/04
USPC .......... 370/241, 252; 455/39, 63.1, 67.11, 91, 455/114.2, 115.1
See application file for complete search history.

(56) References Cited

U.S. PATENT DOCUMENTS

| 2005/0276241 | A1 | 12/2005 | Kamerman et al. | |
| 2010/0197235 | A1 | 8/2010 | Wilhelmsson | |
| 2010/0279682 | A1* | 11/2010 | Rangaiah et al. | 455/426.1 |
| 2012/0163198 | A1* | 6/2012 | Chin et al. | 370/252 |
| 2012/0207040 | A1* | 8/2012 | Comsa et al. | 370/252 |

FOREIGN PATENT DOCUMENTS

| EP | 1404071 B1 | 3/2007 |
| WO | 2009089046 A2 | 7/2009 |
| WO | 2010090567 A1 | 8/2010 |

OTHER PUBLICATIONS

3GPP TSG-RAN2 Meeting #71, R2—104880 Madrid, Spain, Aug. 23-Aug. 27, 2010 LG Electronics Inc. "Possible Solutions for In-device Interference Avoidance" Mobile Competence Centre; 650, Route des Lucioles; F-06921 Sophia-Antipolis Cedex, France pp. 1-2.

(Continued)

*Primary Examiner* — Chi Pham
*Assistant Examiner* — Weibin Huang
(74) *Attorney, Agent, or Firm* — Schwabe Williamson & Wyatt, P.C.

(57) ABSTRACT

According to an embodiment, a communication terminal is described comprising two radio communication modules and a controller configured to, in response to the reception of a request for starting communication using the second radio communication module, perform at least one of requesting from a communication device to perform reception quality measurements of signals received from the first radio communication module if the first radio communication module is transmitting signals to the communication device; and performing reception quality measurements of signals received from the communication device by the first radio communication module if the first radio communication module is receiving signals from the communication device.

18 Claims, 19 Drawing Sheets

(56) References Cited

OTHER PUBLICATIONS

3GPP TSG-RAN WG2 Meeting #71, R2-104910 Madrid, Spain, Aug. 23-27, 2010 Qualcomm Incorporated "Problem Scenarios and Proposed Solutions for In-device Coexistence" Mobile Competence Centre; 650, Route des Lucioles; F-06921 Sophia-Antipolis Cedex, France pp. 1-3.

3GPP TR 36.814 V. 9.0.0 (Mar. 2010) 3rd Generation Partnership Project; Technical Specification Group Radio Access Network; Evolved Universal Terrestrial Radio Access (E-UTRA); Further advancements for E-UTRA—physical layer aspects (Release 9); pp. 1-107.

RP-100671, 3GPP TSG RAN#48, Soul, Korea, Jun. 1-4, 2010, New Study Item Proposal: Signalling and procedure for in-device coexistence interference avoidance, pp. 1-6.

R2-104880, 3GPP TSG-RAN2 Meeting #71, Madrid, Spain, Aug. 23-27, 2010, Possible Solutions for In-device Interference Avoidance, LG Electronics, pp. 1-2.

3GPP TS 36.211 V9.1.0 (Mar. 2010) 3rd Generation Partnership Project; Technical Specification Group Radio Access Network; Evolved Universal Terrestrial Radio Access (E-UTRA); Physical Channels and Modulation (Release 9); pp. 1-87.

3GPP TS 36.331 V9.3.0 (Jun. 2010) 3rd Generation Partnership Project; Technical Specification Group Radio Access Network; Evolved Universal Terrestrial Radio Access (E-UTRA); Radio Resource Control (RRC); Protocol specification (Release 9); pp. 1-250.

* cited by examiner

US 8,817,641 B2

COMMUNICATION TERMINAL, COMMUNICATION DEVICE AND METHODS THEREOF FOR DETECTING AND AVOIDING IN-DEVICE INTERFERENCE

TECHNICAL FIELD

Embodiments generally relate to a communication terminal, a communication device, a method for operating a communication terminal, and a method for operating a communication device.

BACKGROUND

Modern mobile communication terminals support an increasing number of radio communication technologies that may typically at least partially be operated in parallel, e.g. communication with a mobile communication network and Bluetooth communication. Usage of neighboring frequency bands for different radio communication technologies may result in interference. Methods and communication devices/ terminals allowing communication which is robust with respect to such interference are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

3GPP (3rd Generation Partnership Project) has introduced LTE (Long Term Evolution) into the Release 8 version of UMTS (Universal Mobile Telecommunications System) standards. With LTE the UMTS air interface is further optimized for packet data transmission by improving the system capacity and the spectral efficiency. Amongst others, the maximum net transmission rate is increased significantly, namely to 300 Mbps in the downlink transmission direction and to 75 Mbps in the uplink transmission direction. Further, LTE supports scalable bandwidths of 1.4, 3, 5, 10, 15, and 20 MHz and is based on the multiple access methods OFDMA/ TDMA (orthogonal frequency division multiple access/time division multiple access) in downlink and SC-FDMA/TDMA (single carrier-frequency division multiple access/TDMA) in uplink. OFDMA/TDMA is a multicarrier multiple access method in which a subscriber is provided with a defined number of subcarriers in the frequency spectrum and a defined transmission time for the purpose of data transmission. The RF bandwidth capability of an LTE UE (user equipment) for transmission and reception has been set to 20 MHz. A physical resource block (PRB) is the baseline unit of allocation for the physical channels defined in LTE. A physical resource block includes a matrix of 12 subcarriers by 6 or 7 OFDMA/SC-FDMA symbols. A pair of one OFDMA/SC-FDMA symbol and one subcarrier is denoted as resource element.

Figure 1:
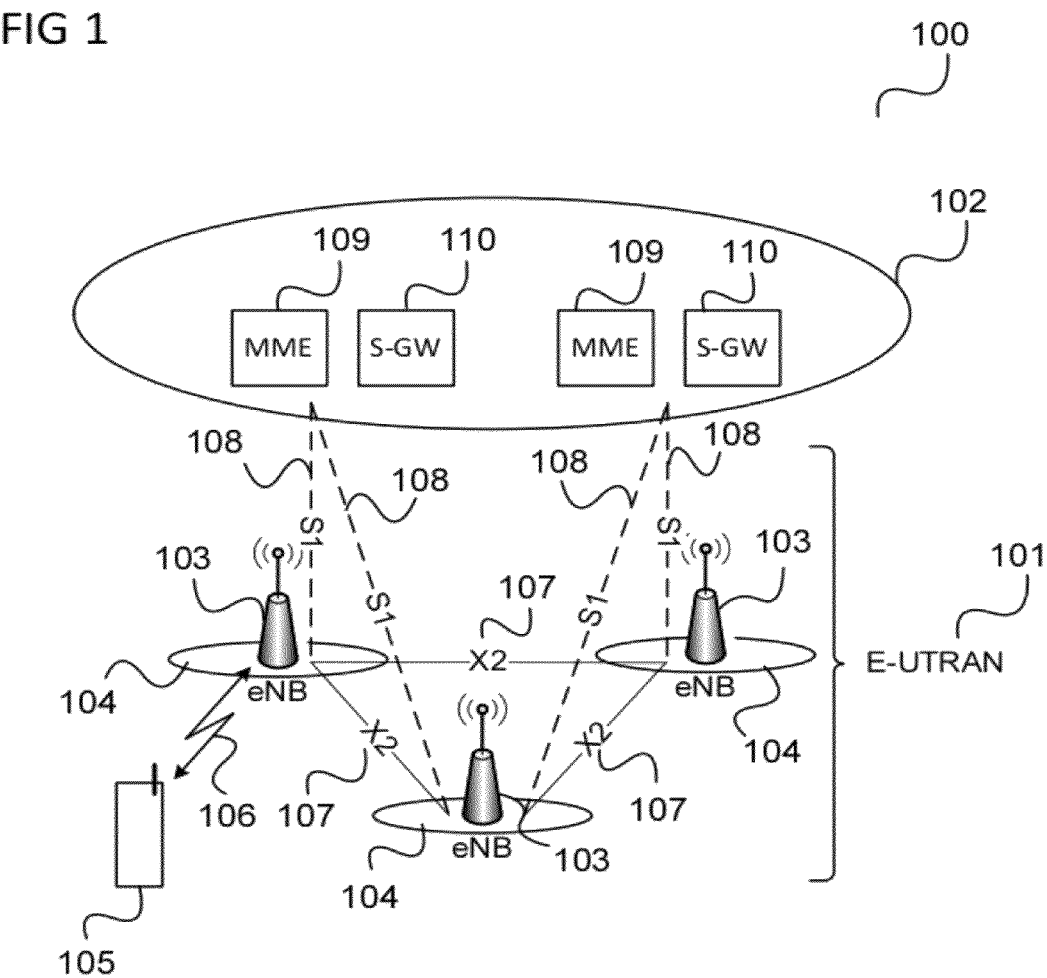
FIG. 1 shows a communication system according to an embodiment.

FIG. 1 shows a communication system 100 according to an embodiment.

According to this embodiment, the communication system 100 is configured in accordance with the network architecture of LTE.

The communication system 100 includes a radio access network (E-UTRAN, Evolved UMTS Terrestrial Radio Access Network) 101 and a core network (EPC, Evolved Packet Core) 102. The E-UTRAN 101 may include base (transceiver) stations (eNodeBs, eNBs) 103. Each base station 103 provides radio coverage for one or more mobile radio cells 104 of the E-UTRAN 101.

A mobile terminal (UE, user equipment) 105 located in a mobile radio cell 104 may communicate with the core network 102 and with other mobile terminals 105 via the base station providing coverage (in other words operating) in the mobile radio cell.

Control and user data are transmitted between a base station 103 and a mobile terminal located in the mobile radio cell 104 operated by the base station 103 over the air interface 106 on the basis of a multiple access method.

The base stations 103 are interconnected with each other by means of the X2 interface 107. The base stations are also connected by means of the S1 interface 108 to the core network (Evolved Packet Core) 102, more specifically to an MME (Mobility Management Entity) 109 and a Serving Gateway (S-GW) 110. The MME 109 is responsible for controlling the mobility of UEs located in the coverage area of E-UTRAN, while the S-GW 110 is responsible for handling the transmission of user data between mobile terminals 105 and core network 102.

Data transmission between the mobile terminal 105 and the corresponding base station 103 (i.e. the base station operating the radio cell in which the mobile terminal 105 is located) is carried out in accordance with a (radio) frame structure. An example for a frame structure, denoted as frame structure type 1, is shown in FIG. 2.

Figure 2:
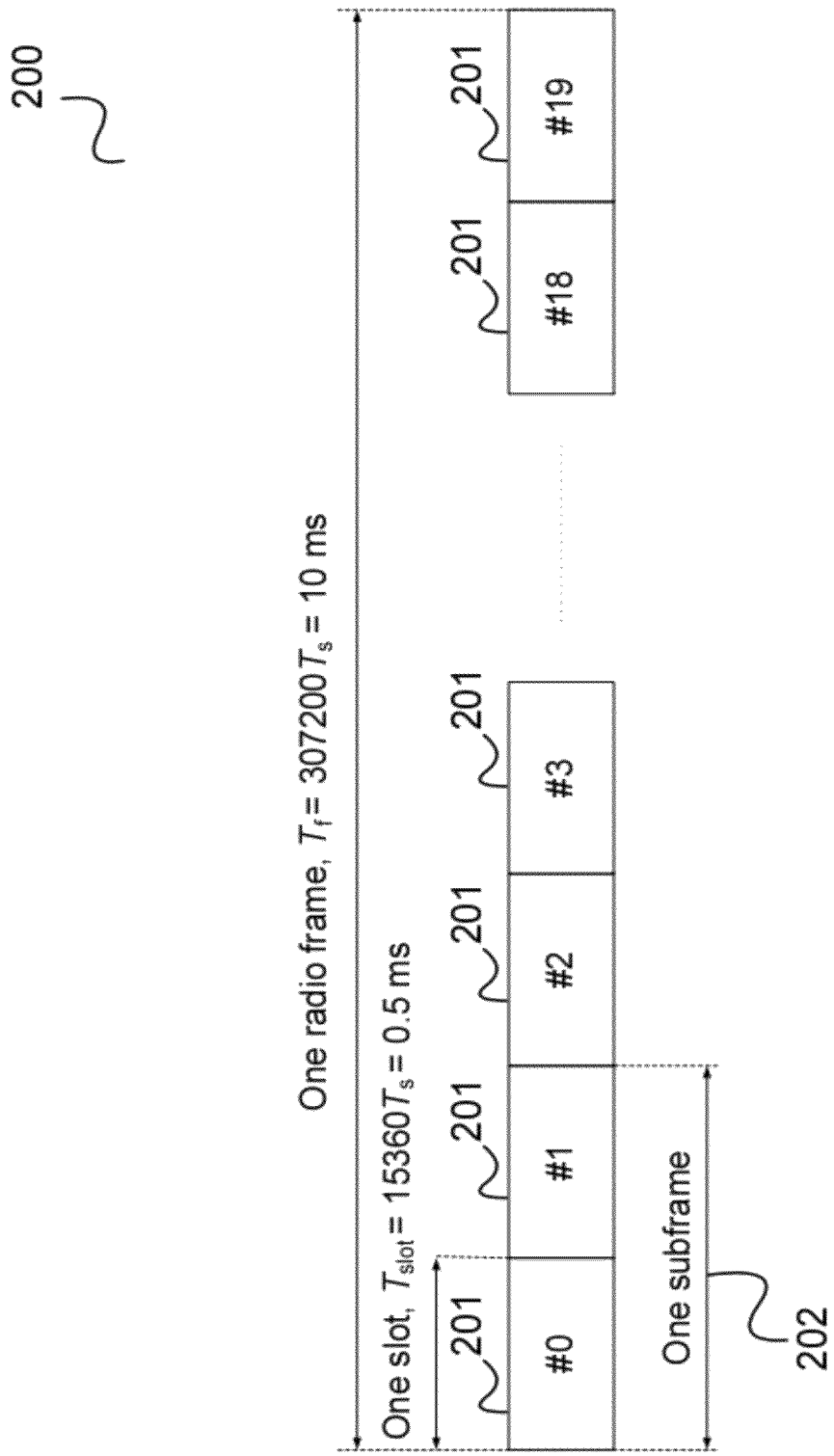
FIG. 2 shows a frame in accordance with an embodiment.

FIG. 2 shows a frame 200 in accordance with an embodiment.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval 10 subframes 202 are available for downlink transmissions or uplink transmissions. Uplink and downlink transmissions are separated in the frequency domain. Depending on the slot format a subframe 202 may include 14 or 12 OFDMA (orthogonal frequency division multiple access) symbols in DL (downlink) and 14 or 12 SC-FDMA symbols in UL (uplink), respectively.

In DL a subframe of length 1 ms is separated into a control channel region occupying a definite number of OFDMA symbols (up to 4 OFDMA symbols), and a PDSCH region occupying the remaining OFDMA symbols. The length of the control channel region and PDSCH region is configured by the network.

In one embodiment, according to LTE, the communication system 100 supports the following types of duplexing methods: full-duplex FDD (frequency division duplexing), half-duplex FDD and TDD (time division duplexing). This is illustrated in FIG. 3.

Figure 3:
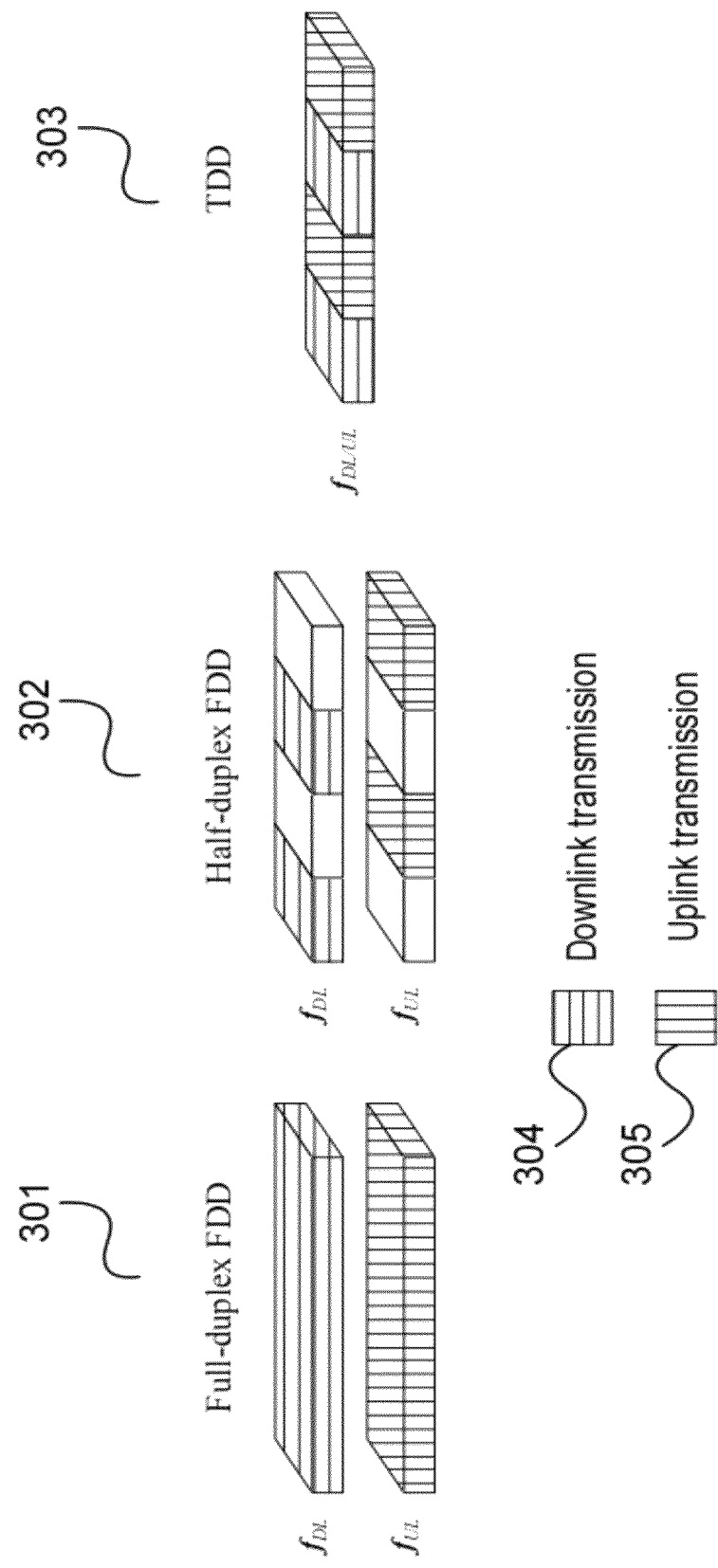
FIG. 3 shows transmission diagrams illustrating full-duplex FDD, half-duplex FDD, and TDD.

FIG. 3 shows a first transmission diagram 301 illustrating full-duplex FDD, a second transmission diagram 302 illustrating half-duplex FDD, and a third transmission diagram 303 illustrating TDD.

In the transmission diagrams 301, 302, 303 downlink transmissions are indicated by a first hatching 304 and uplink transmissions are indicated by a second hatching 305. In each of the transmission diagrams 301, 302, 303 time is increasing from left to right.

According to full-duplex FDD two separate frequency bands ($f_{UL}$ and $f_{DL}$) are used for uplink (UL) transmission (i.e. transmission from mobile terminal 105 to base station 103) and downlink (DL) transmission (i.e. transmission from base station 103 to mobile terminal 105) and both transmissions can occur simultaneously. According to half-duplex FDD also two separate frequency bands ($f_{UL}$ and $f_{DL}$) are used for uplink and downlink transmissions, but both transmissions are non-overlapping in time. According to TDD the same frequency band ($f_{UL/DL}$) is used for transmission in both uplink and downlink. Within a time frame the direction of transmission may be switched alternatively between downlink and uplink.

A main benefit of half-duplex FDD compared to full-duplex FDD is that the FDD duplex filter of the mobile terminal 105 required for full-duplex FDD can be replaced by a simple switch for transmit/receive separation for half-duplex FDD. The duplex filter is needed for full-duplex FDD in order to separate the received waveform from the transmitted waveform. This duplex filter is expensive from the point of view of the mobile terminal 105 in terms of battery consumption, power amplifier cost and radio frequency sensitivity. Regarding the half-duplex FDD operation in LTE the main principle is that half-duplex FDD operation is under the control of the base station 103 (i.e. the eNodeB in case of LTE), i.e. the scheduler of the base station 103 scheduling the transmissions of the mobile terminal 103 has to ensure that the mobile terminal 103 is not transmitting and receiving in the same subframe.

The support of either FDD mode is a capability of the mobile terminal 105, i.e., in case of LTE, the mobile terminal 105 sends a "UE capability information" message in RRC_CONNECTED state (see below) to the base station 103 signalling the supported FDD mode for each supported radio frequency band. The transfer of the "UE capability information" message can be either requested by the network or initiated by the mobile terminal 105. Currently, mixed FDD deployments in a radio frequency band are not supported according to LTE, i.e. a mobile terminal 105 can be operated in an LTE radio cell either in full-duplex or half-duplex FDD mode.

For the efficient control of radio resources and communication connections between a mobile terminal 105 and a base station (eNodeB) 103 two connection states are in one embodiment, according to LTE, specified at the RRC protocol layer, the state RRC_IDLE (also referred to as idle mode) and the state RRC_CONNECTED (also referred to as connected mode). These RRC states and the transitions between these states are illustrated in FIG. 4.

Figure 4:
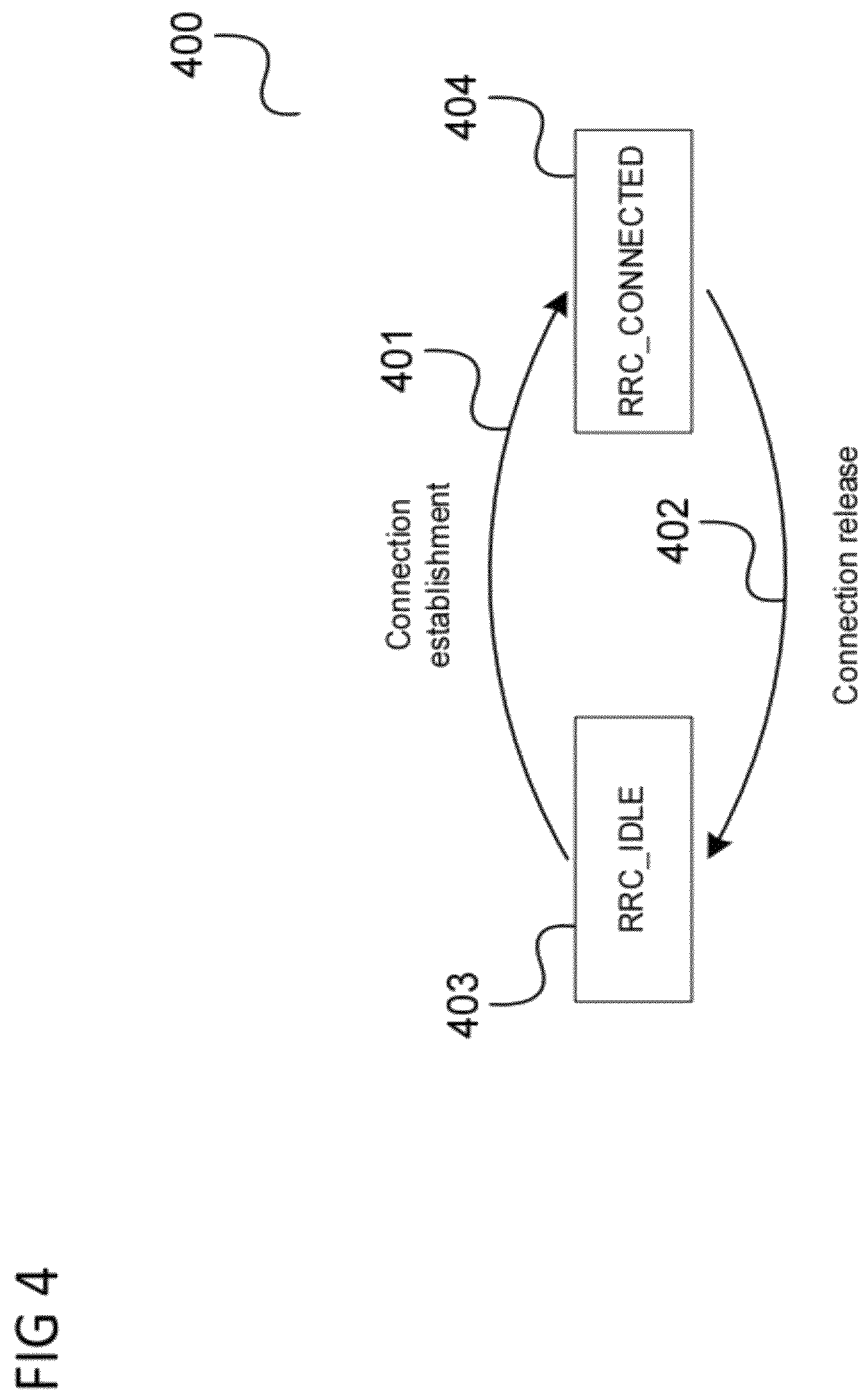
FIG. 4 shows a state transition diagram according to an embodiment.

FIG. 4 shows a state transition diagram 400 according to an embodiment.

A first state transition 401 from RRC_IDLE state 403 to RRC_CONNECTED state 404 for example occurs when a communication connection is established between the respective mobile terminal 105 and the respective base station 103.

A second state transition 402 from RRC_CONNECTED state 404 to RRC_IDLE state 403 for example occurs when a communication connection between the respective mobile terminal 105 and the respective base station 103 is released.

RRC_CONNECTED state 404 and RRC_IDLE state 403 may for example be characterized as follows.

RRC_IDLE:
No RRC connection is established
The UE position (i.e. the position of the respective mobile terminal 105) is known by the network (i.e. the E-UTRAN 101 and/or the core network 102) at tracking area level (a tracking area defines a group of radio cells 104 where the mobile terminal 105 in RRC_IDLE state registers and where the mobile terminal 105 is paged in case of an incoming communication attempt);
The mobile terminal 105 performs cell (re-)selection;
The mobile terminal 105 acquires system information which is broadcast in the radio cell 104;
No transmission of user and control data in uplink and downlink by the mobile terminal 105 and the base station 103;
The mobile terminal 105 monitors a paging channel to receive notification about incoming calls or modification of system information;
RRC_CONNECTED:
An RRC connection is established between the mobile terminal 105 and the base station 103;
The mobile terminal 105 is connected to one radio cell 104 only and based on measurements reported by the mobile terminal 105 (e.g. received signal strength of reference signals of detected neighboring radio cells 104) network controlled mobility is performed by explicit handover and cell change order;
The mobile terminal 105 position is known by the network at cell area level;
The mobile terminal 105 acquires system information which are broadcast in the radio cell;

Transmission of user and control data in uplink and downlink;

The mobile terminal 105 monitors a paging channel to receive notification about modification of system information.

The RRC connection is defined as a point-to-point bidirectional connection between RRC peer entities in the mobile terminal 105 and the base station 103. According to one embodiment, there is either none or one RRC connection between a mobile terminal and a base station.

According to one embodiment, for transmission of user and control data in uplink and in downlink in RRC_CONNECTED state the following physical channels are used:

PUSCH:

Uplink physical channel, carries user and control data.

Carries DM RS (demodulation reference signal) to facilitate coherent demodulation of PUSCH at the base station (eNB). Occupies two SC-FDMA symbols per subframe.

PUCCH:

Uplink physical channel only, i.e. no logical and transport channels are mapped to this channel.

Carries the control information such as HARQ (Hybrid automatic repeat request) ACK/NACKs (acknowledgements/negative acknowledgements) in response to downlink transmissions on PDSCH, scheduling requests and CQI (channel quality indication) reports.

Carries DM RS to facilitate coherent demodulation of PUCCH at the base station. Occupies 2, 4 or 6 SC-FDMA symbols per subframe depending on slot format and PUCCH format.

PDSCH:

Downlink physical channel, carries user and control data, paging messages and system information.

Is transmitted in the PDSCH region of a subframe, i.e. occupies the OFDMA symbols in a subframe not occupied by PDCCH.

In Release 8 no DM RS are transmitted, but from Release 10 onwards DM RS are transmitted to facilitate coherent demodulation of PDSCH at the mobile terminal. The number of resource elements used for DM RS in a subframe depends on slot format and channel condition.

PDCCH:

Downlink physical channel only, i.e. no logical and transport channels are mapped to this channel.

Carries the control information related to downlink/uplink transmissions on PDSCH/PUSCH such as resource assignments and HARQ information.

Is transmitted in the control channel region of a subframe occupying 1, 2, 3 or 4 OFDMA symbols in the first slot in a subframe. The number of symbols is adjusted by network.

Carries no DM RS.

Figure 5:
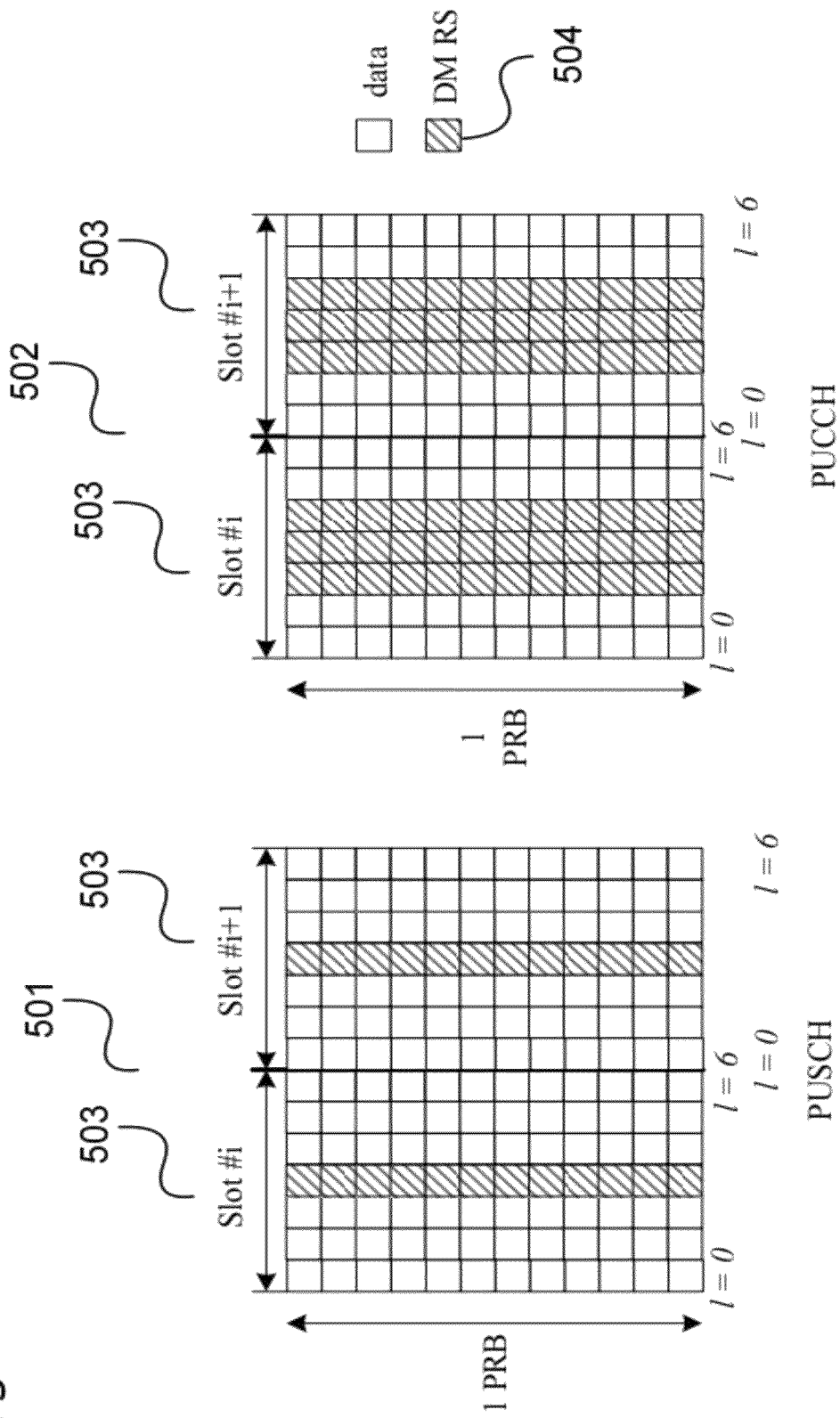
FIG. 5 shows a first symbol allocation diagram and a second symbol allocation diagram.

In FIG. 5, two examples for mapping of demodulation reference signals (DM RS) for PUSCH and PUCCH are illustrated.

FIG. 5 shows a first symbol allocation diagram 501 and a second symbol allocation diagram 502.

The first symbol allocation diagram 501 and the second symbol allocation diagram 502 each show the allocation for one sub-frame, each sub-frame including two slots (slot #i and slot #i+1) 503 as explained above with reference to FIG. 2 above.

In the examples illustrated in FIG. 5 the slot format is such that each slot 503 includes 7 SC-FDMA symbols (numbered from 0 to 6) per sub-carrier. A physical resource block (PRB) includes the SC-FDMA symbols of one slot and of 12 sub-carriers, i.e. 84 SC-FDMA symbols altogether.

As indicated by the hatching 504, according to the allocation indicated by the first symbol allocation diagram 501 the middle symbol (symbol number 3) is allocated for DM RS transmission in each slot 503 and according to the allocation indicated by the second symbol allocation diagram 502 the middle three symbols (symbols number 2, 3, and 4) are allocated for DM RS transmission in each slot 503. The second symbol allocation diagram 502 corresponds to the PUCCH format carrying Scheduling Request message with which the mobile terminal requests from the base station new PUSCH resources for transmission.

Figure 6:
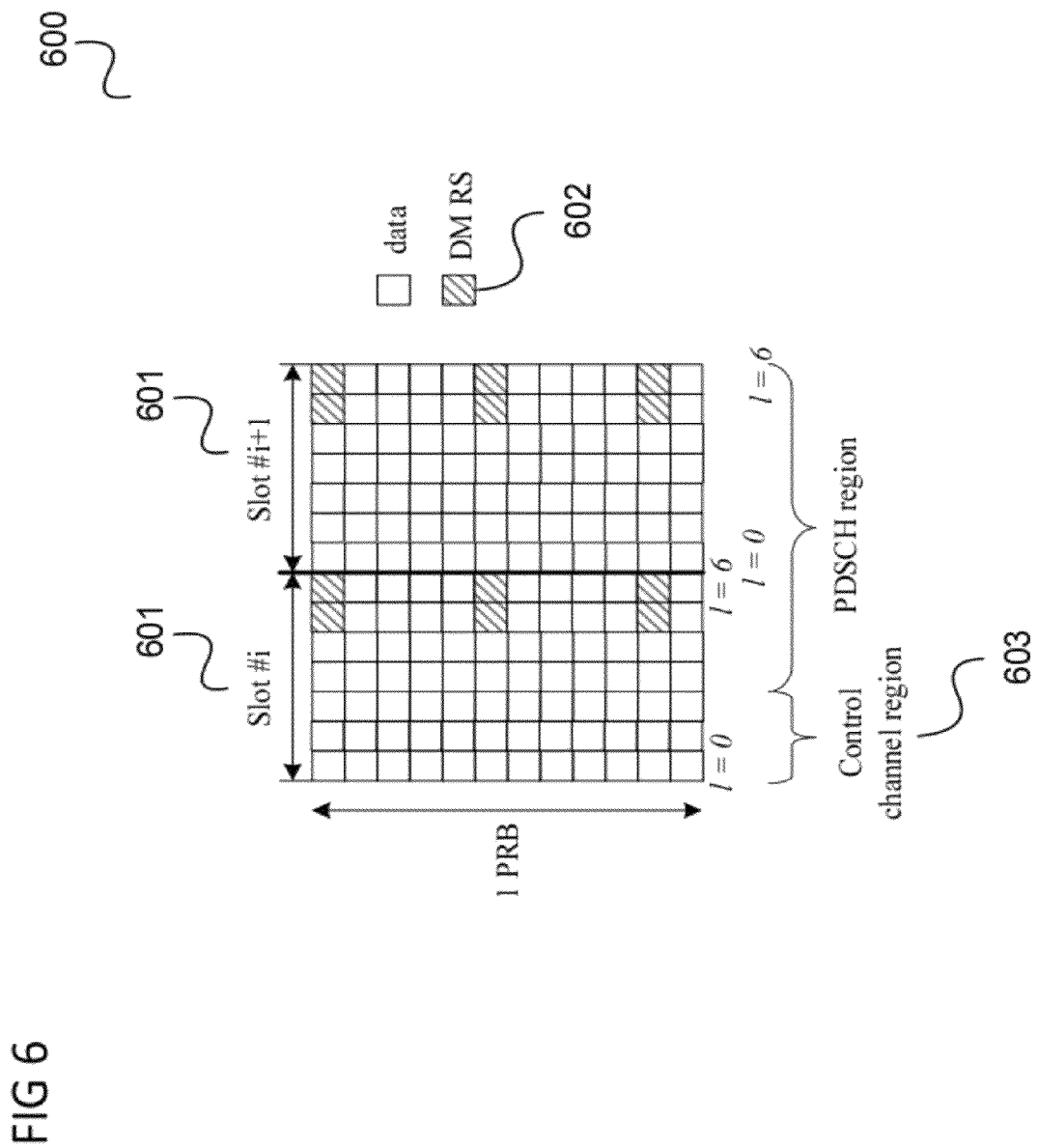
FIG. 6 shows a symbol allocation diagram.

In FIG. 6, an example for a mapping of demodulation reference signals (DM RS) for PDSCH is illustrated.

FIG. 6 shows a symbol allocation diagram 600.

The symbol allocation diagram 600 shows the allocation for one sub-frame including two slots (slot #i and slot #i+1) 601 as explained above with reference to FIG. 2 above.

In the example illustrated in FIG. 6 the slot format is such that each slot 601 includes 7 OFDMA symbols (numbered from 0 to 6) per sub-carrier. A physical resource block (PRB) includes the OFDMA symbols of one slot and of 12 sub-carriers, i.e. 84 OFDMA symbols altogether.

As indicated by the first hatching 602, according to the allocation indicated by the symbol allocation diagram 600 the mapping of DM RS for PDSCH uses 12 resource elements. In the example a length of control channel region 603 of 3 OFDMA symbols is considered.

Currently, 3GPP is working on further advancements of LTE in Release 10 in terms of spectral efficiency, cell edge throughput, coverage and latency, also referred to as LTE-Advanced (LTE-A). Key technologies include relaying, uplink MIMO (multiple input multiple output) with up to (4×4) antennas, downlink MIMO with up to (8×8) antennas, support of bandwidths >20 MHz and up to 100 MHz by carrier aggregation, and intercell interference management.

One of the key characteristics of LTE-Advanced is the support of bandwidths >20 MHz and up to 100 MHz by spectrum aggregation, i.e. an LTE-Advanced (LTE-A) mobile terminal may be configured with a bandwidth of up to 100 MHz by aggregation of up to 5 so-called component carriers (CC), wherein the bandwidth size of each component carrier is limited to a maximum of 20 MHz. The component carriers may be adjacent or non-adjacent, and in FDD mode asymmetric allocation of DL and UL component carriers is considered, i.e. different number of component carriers of different bandwidths in UL and DL. A mobile terminal according to LTE-A may simultaneously receive or transmit on one or multiple component carriers depending on its RF capabilities.

Figure 7:
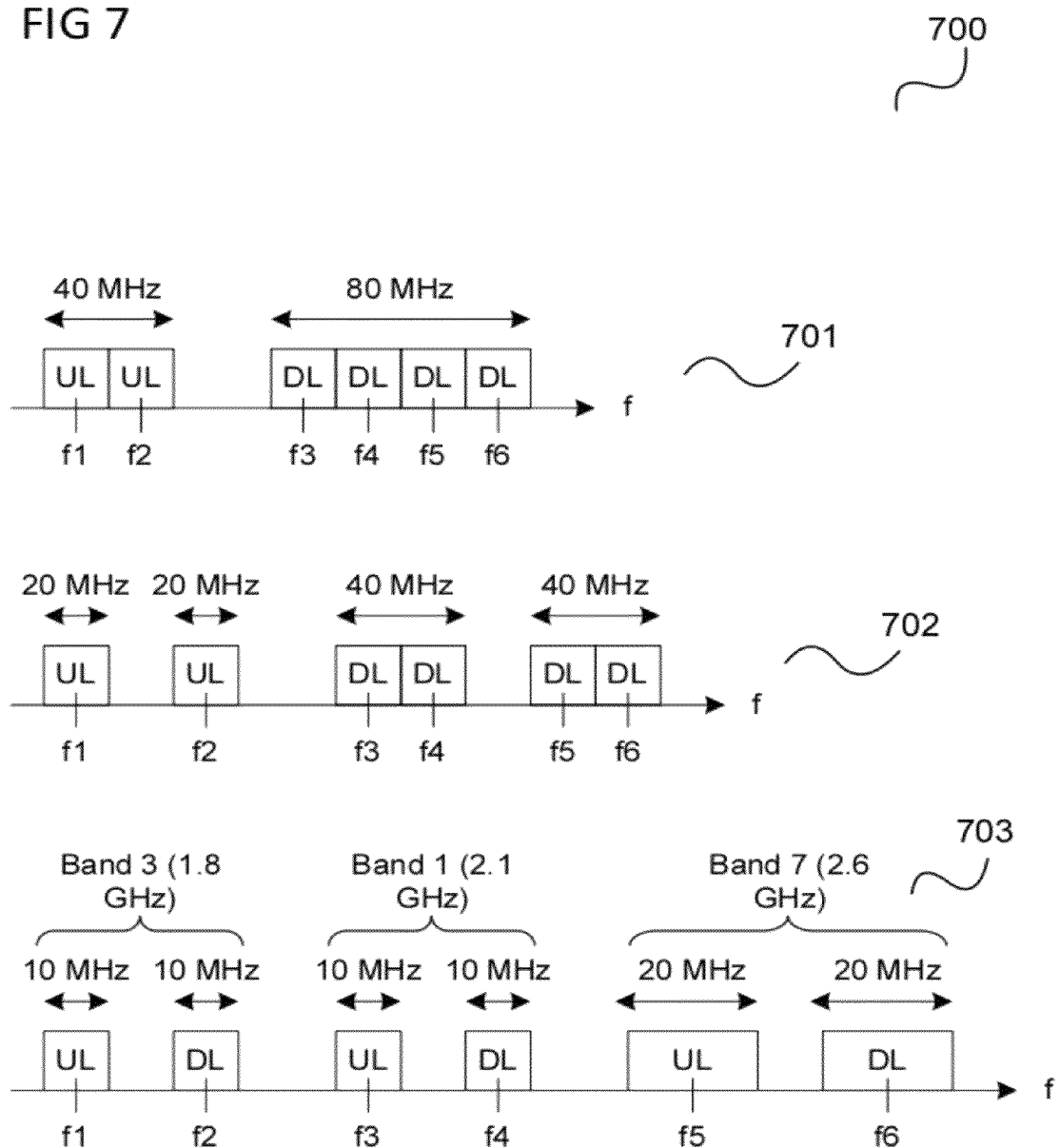
FIG. 7 shows frequency allocation diagrams.

Exemplary radio frequency (RF) deployment scenarios according to one embodiment, in accordance with LTE-A operating in FDD mode, are illustrated in FIG. 7.

FIG. 7 shows frequency allocation diagrams 701, 702, 703.

A first frequency allocation diagram 701 shows a first scenario being a single band, contiguous and asymmetric RF deployment scenario in UL/DL, wherein the bandwidth size of each component carrier is 20 MHz. The UL is composed of two adjacent component carriers characterized by the carrier frequencies f1 and f2 (i.e. 40 MHz UL contiguous). The DL is composed of four adjacent component carriers characterized by the carrier frequencies f3 to f6 (i.e. 80 MHz DL contiguous).

Analogously, a second frequency allocation diagram 702 illustrates a second scenario being a single band scenario with 80 MHz DL (non-contiguous) and 40 MHz UL (non-contiguous).

A third frequency allocation diagram 703 illustrates a third scenario being a multi band scenario with 40 MHz in UL and DL (non-contiguous).

A mobile terminal 105 may support multiple radio technologies such as 3G UMTS, 2G GSM (Global System for Mobile Communications), WLAN (Wireless Local Area Network) and Bluetooth to provide its user access to wide range of services and applications. In cases where multiple radio technologies within a mobile terminal 105 are operated in parallel, these technologies may interfere with each other. Such in-device interference may happen when the radio technologies work on adjacent frequencies, e.g. WLAN/Bluetooth and 3G UMTS. This is illustrated in FIG. 8.

Figure 8:
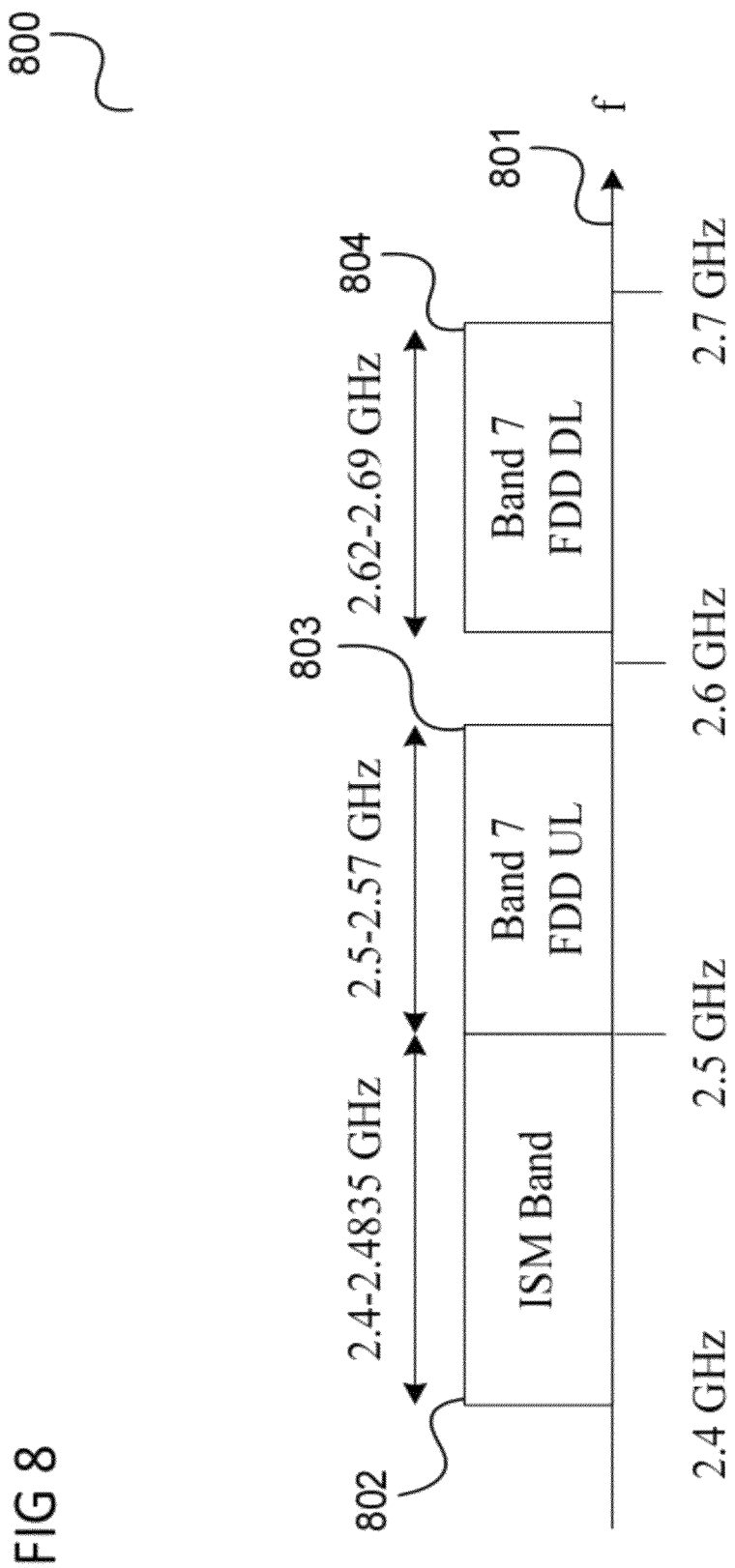
FIG. 8 shows a frequency allocation diagram.

FIG. 8 shows a frequency allocation diagram 800.

In the frequency allocation diagram 800, similarly as in FIG. 7, frequency increases along a frequency axis 801. A first frequency band 802 is the ISM (Industrial, Scientific, and Medical) band. The license-free ISM band 802 (2.4 GHz-2.4835 GHz) can be used for communication according to WLAN (standard for wireless LAN connectivity) according to IEEE 802.11b or 802.11g and Bluetooth (standard for short-range connectivity). According to both technologies, TDD is used as duplexing scheme. According to WLAN the ISM band 802 is separated into three non-overlapping RF (radio frequency) channels of 22 MHz bandwidth each and one specific RF channel is used for data transmission between a WLAN device and a WLAN access point.

In Bluetooth the ISM band is separated into 79 RF channels of 1 MHz bandwidth each beginning at 2.402 GHz. For data transmission between two Bluetooth devices all 79 RF channels are used according to a frequency hopping scheme. Further, in order to minimize interference to WLAN when Bluetooth and WLAN are operated simultaneously in the ISM band data transmission between two Bluetooth devices can be performed according to an adaptive frequency hopping scheme, wherein particular RF channels are avoided that are currently used by a WLAN.

In this example, a second frequency band 803 adjacent to the first frequency band 802 and a third frequency band 804 are assumed to be allocated as "band 7" for 3G UMTS FDD communication in uplink and downlink.

Transmissions according to WLAN or Bluetooth communication in the first frequency band 802 may interfere with the reception according to 3G UMTS FDD communication in the second frequency band 803.

Such in-device interference problems may be expected to occur in the future more frequently as it can be expected that more and more frequency spectrum will be allocated for 3G radio technologies and its future enhancements (such as LTE that has been specified in 3GPP standardization for a and introduced in the Release 8 version of UMTS specifications).

In table 1 the candidate interference scenarios between LTE/LTE-A communication and WLAN/Bluetooth communication from a mobile terminal point of view are summarized when these radio technologies within the same device are operated in parallel on adjacent frequencies for transmission (TX) from the mobile terminal and reception (RX) by the mobile terminal.

TABLE 1

Interference scenarios between LTE/LTE-A and ISM (WLAN/Bluetooth) from mobile terminal point of view

| Scenario | LTE/LTE-A | ISM | Coexistence problem |
|---|---|---|---|
| 1 | RX | TX | LTE/LTE-A radio: interfered by ISM, ISM radio: normal operation |
| 2 | TX | RX | LTE/LTE-A radio: normal operation, ISM radio: interfered by LTE/LTE-A |
| 3 | RX | RX | None |
| 4 | TX | TX | LTE/LTE-A radio: interfered by ISM, ISM radio: interfered by LTE/LTE-A |

The in-device interference problem has been identified in 3GPP and as result a study is currently conducted to investigate suitable mechanisms for interference avoidance from signaling and procedure point of view to facilitate the coexistence scenarios i) LTE and ISM, and ii) LTE and GPS.

The following measures can for example be taken to avoid interference between communication in ISM band 802 and LTE/LTE-A communication:

The mobile terminal avoids the problematic frequency at cell selection/reselection: When the mobile terminal performs cell selection/reselection, the mobile terminal selects the cell that does not cause potential in-device interference with ISM radio or GPS (Global Positioning System).

The mobile terminal informs the in-device coexistence capability at RRC connection establishment/reestablishment: When a mobile terminal makes an RRC connection to a network, it notifies the network of the in-device coexistence capability of the mobile terminal. Then, the network may handover the mobile terminal to another frequency right after the completion of the RRC connection establishment or may perform some coordination in advance depending on an implementation of the network.

The mobile terminal notifies the activation of the in-device: When ISM radio or GPS is turned on, the UE notifies the network of the in-device activation. A notification of in-device activation triggers the network to take actions such as handover or other coordination schemes to cope with the interference.

The mobile terminal may signal in-device interference to another communication network: In case the in-device interference is severe, the mobile terminal cannot communicate with the (original) communication network, and would experience radio link failure. After radio link failure is over, the mobile terminal camps on the other communication network, and informs the other communication network of the in-device interference at the original frequency so that the other network does not redirect the mobile terminal to the original frequency.

According to one embodiment, an alternative solution for in-device interference detection and avoidance for the scenarios 1 and 4 of Table 1 and for an LTE-Advanced communication system is proposed.

Figure 9:
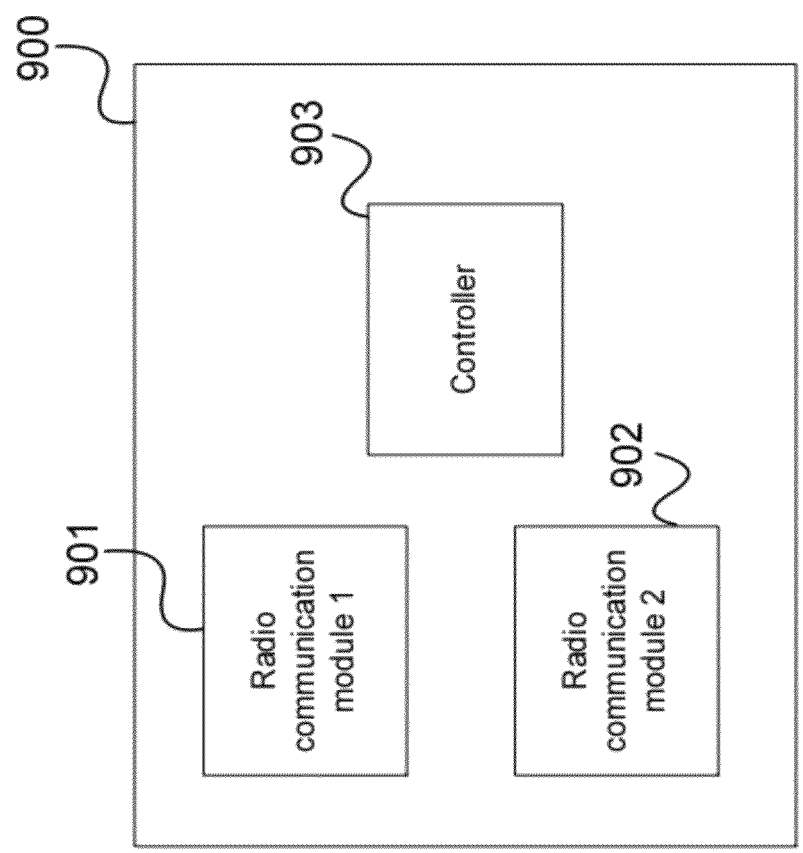
FIG. 9 shows a communication terminal according to an embodiment.

FIG. 9 shows a communication terminal 900 according to an embodiment.

The communication terminal 900 includes a first radio communication module 901 configured to operate according to a first radio communication technology and a second radio communication module configured to operate according to a second radio communication technology 902. The communication terminal 900 further includes a controller configured to, in response to the reception of a request for starting communication using the second radio communication module, perform at least one of requesting from a communication device to perform reception quality measurements of signals received from the first radio communication module if the first radio communication module is transmitting signals to the communication device and performing reception quality measurements of signals received from the communication device by the first radio communication module if the first radio communication module is receiving signals from the communication device.

According to one embodiment, in other words, carrying out measurements (either by the communication terminal itself or by the communication device) is triggered by the start of communication (or at least the request for starting the communication) using the second radio communication module. The first radio communication module and the second radio communication module for example operate in adjacent frequency bands such that communication by the second radio communication module (e.g. operating in ISM band) may interfere with communication by the first radio communication module (e.g. operating according to a licensed frequency band, e.g. an LTE frequency band). The second radio communication technology may accordingly be a radio communication technology such as Bluetooth, WLAN (e.g. IEEE 802.11b or 802.11g), or GPS reception. The first radio communication technology is for example a mobile communication network communication technology such as UMTS, GSM, LTE, LTE-A, etc. According to one embodiment, the reception of the request for starting communication using the second radio communication module is the reception of an activation signal for the second radio communication module.

According to one embodiment, the controller is further configured to activate the second radio communication module in response to the reception of the request for starting communication using the second radio communication module.

According to one embodiment, the controller configured is configured to perform at least one of requesting from the communication device to perform the reception quality measurements and performing the reception quality measurements after the requested communication using the second radio communication module has been started.

The communication terminal may further include a signaling circuit and the controller is further configured to control, in response to the reception of the request to start communication using the second radio communication module, the signaling circuit to signal to the communication device that communication using the second radio communication module is going to be started or has started. For example, the request to the communication device is an indication that communication using the second radio communication module is going to be started or has started.

The reception quality measurements are for example measurements of interference to the communication by the first radio communication module caused by the second radio communication module.

According to one embodiment, the controller is further configured to initiate a controlling action based on the result of the measurements.

For example, the controlling action is a reconfiguration of the first radio communication module.

The reconfiguration for example includes at least one of a reconfiguration of communication resources to be used by the first radio communication module and a reconfiguration of a duplexing mode used by the first radio communication module.

The reconfiguration may for example include a switch from half-duplex frequency division duplexing to full-duplex frequency division duplexing or from full-duplex frequency division duplexing to half-duplex frequency division duplexing.

The communication terminal may further include a receiver configured to receive time domain scheduling information for scheduling data transmission to the communication device and data reception from the communication device in half-duplex frequency division duplexing and wherein the controller is further configured to control the first radio communication module to transmit data to the communication device and to receive data from the communication device according to the scheduling information. The time domain scheduling information is for example an uplink-downlink configuration for the mobile terminal, e.g. an indication which time slots are to be used for transmission and which time slots are to be used for reception.

According to one embodiment, the request to the communication device is an indication that communication using the second radio communication module is going to be started or has started.

According to one embodiment, the controller is configured to signal, in response to the reception of a request for starting communication using the second radio communication module, to the communication device that communication using the second radio communication module is going to be started or has started, wherein the communication terminal further includes a receiver and wherein the controller is configured to perform reception quality measurements of signals received from the communication device by the first radio communication module if the first radio communication module is receiving signals from the communication device upon reception of a request from the communication device to perform reception quality measurements of signals received from the communication device by the first radio communication module.

In other words, the performing of measurements by the communication terminal in response to the reception of the request for starting communication using the second radio communication module may include informing the communication device about the request for starting communication using the second radio communication module and performing the measurements if the communication device requests (or confirms) that the measurements are to be performed. Thus, the performing of measurements in response to the reception of the request may be subject to other requirements, e.g. the reception of an indication (or confirmation) from the communication device that the measurements are to be performed. Alternatively, the controller 903 may be configured to perform the measurements without request from the communication device, i.e. the controller may be configured to perform the measurements if the request for starting communication is received even if there is no request by the communication device to perform the measurements. In other words, the communication terminal may autonomously initiate the measurements.

According to one embodiment, the request from the communication device includes measurement parameters according to which the reception quality measurements of signals received from the first radio communication module are to be performed.

According to one embodiment, the controller is configured to, in response to the reception of a request for starting communication using the second radio communication module, perform both of requesting from a communication device to perform reception quality measurements of signals received from the first radio communication module and performing reception quality measurements of signals received from the communication device by the first radio communication module if the first radio communication module is transmitting signals to the communication device and receiving signals from the communication device.

The communication device is for example a base station (e.g. of a mobile communication network). For example, the communication device is a base station with which the communication terminal communicates using the first radio communication module.

Figure 10:
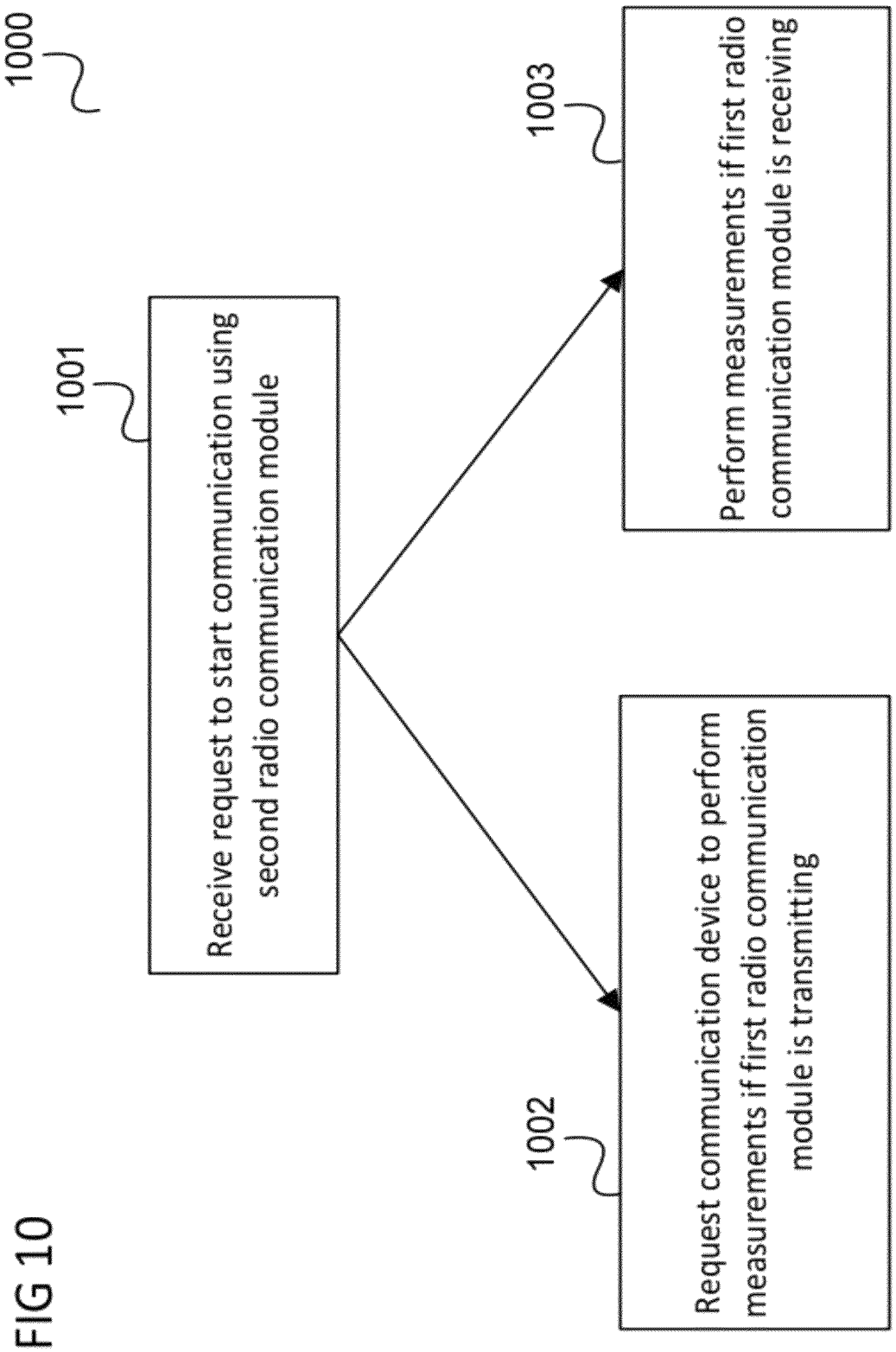
FIG. 10 shows a flow diagram according to an embodiment.

The communication terminal 900 for example carries out a method as illustrated in FIG. 10.

FIG. 10 shows a flow diagram 1000 according to an embodiment.

The flow diagram 1000 illustrates a method for operating a communication terminal including a first radio communication module configured to operate according to a first radio communication technology and including a second radio communication module configured to operate according to a second radio communication technology.

In 1001, a request for starting communication using the second radio communication module is received.

In 1002, in response to the reception of the request it is requested from a communication device to perform reception quality measurements of signals received from the first radio communication module if the first radio communication module is transmitting signals to the communication device.

In 1003, reception quality measurements of signals received from the communication device by the first radio communication module are performed if the first radio communication module is receiving signals from the communication device.

Figure 11:
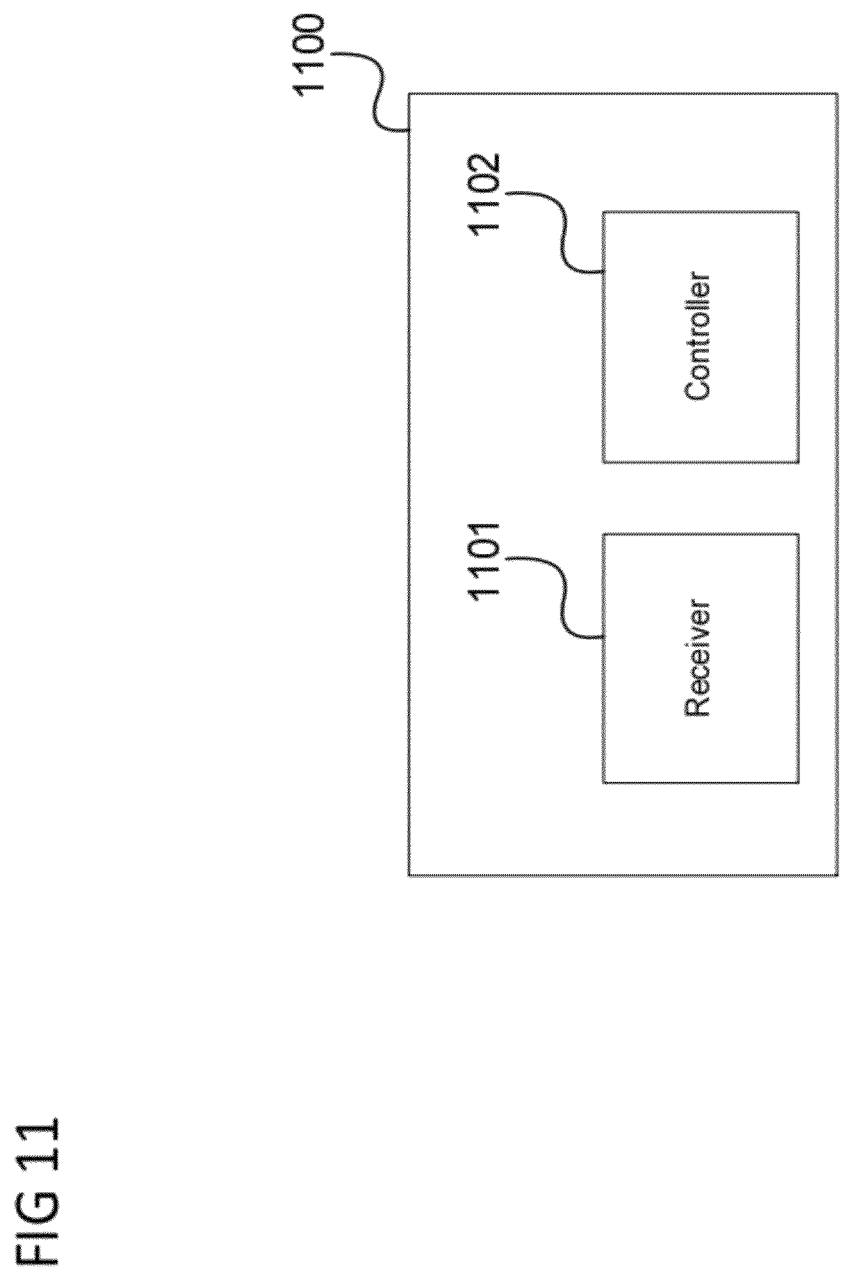
FIG. 11 shows a communication device according to an embodiment.

The communication terminal 900 for example communicates with a communication device as illustrated in FIG. 11.

FIG. 11 shows a communication device 1100 according to an embodiment.

The communication device 1100 comprises a receiver 1101 configured to receive from a communication terminal which includes a first radio communication module configured to operate according to a first radio communication technology and a second radio communication module configured to operate according to a second radio communication technology (e.g. a communication terminal 900 as shown in FIG. 9) a message indicating that communication using the second radio communication module is going to be started or has started.

The communication device 1100 further includes a controller 1102 configured to, in response to the reception of the indication, perform at least one of performing reception quality measurements of signals received from the first radio communication module if the first radio communication module is transmitting signals to the communication device and requesting from the communication terminal to perform reception quality measurements of signals received by the first radio communication module if the first radio communication module is receiving signals from the communication device.

According to one embodiment, the controller is further configured to initiate a controlling action based on the result of the measurements.

The controlling action is for example a reconfiguration of the first radio communication module.

Figure 12:
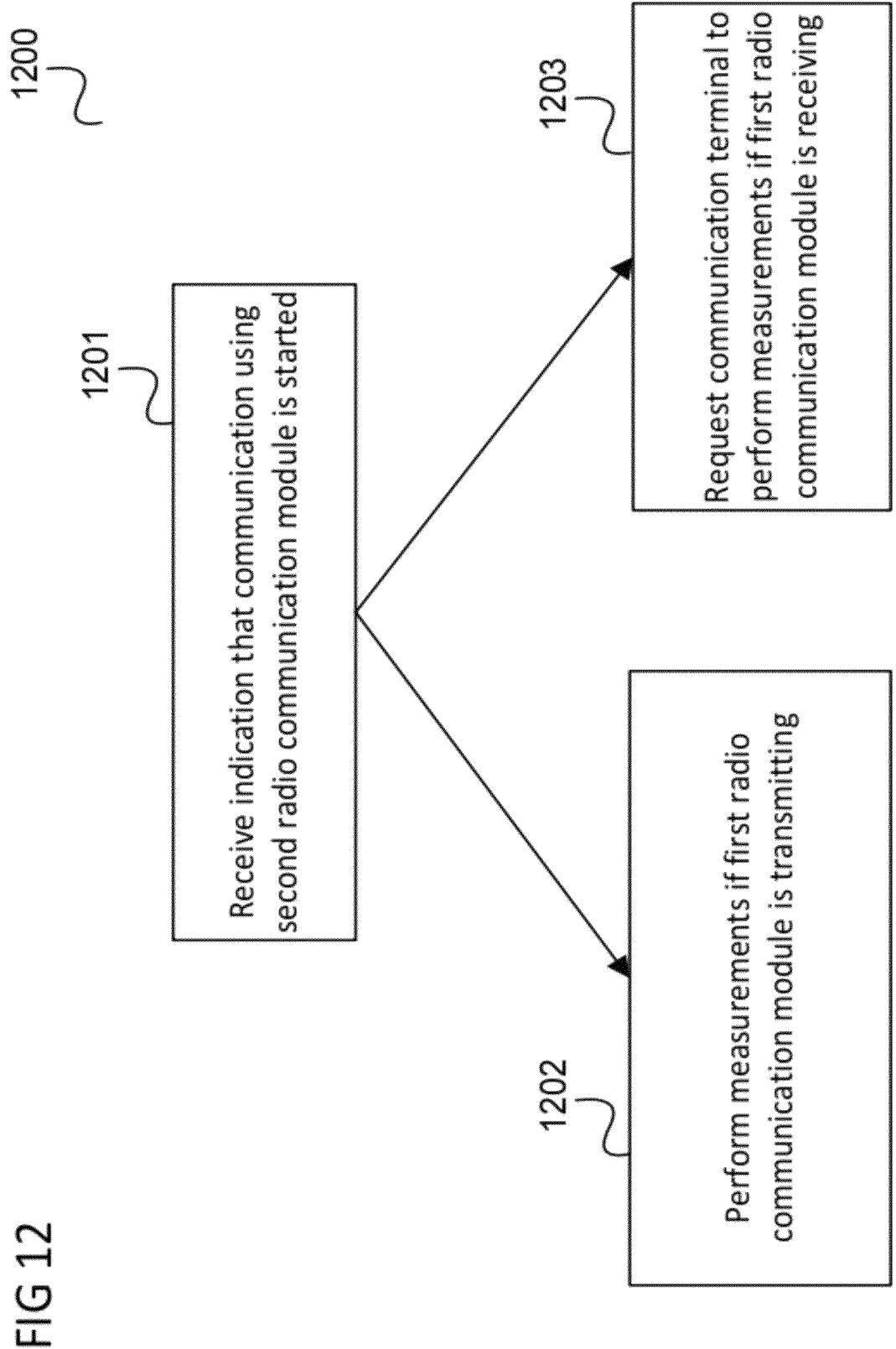
FIG. 12 shows a flow diagram according to an embodiment.

The communication device 1100 for example carries out a method as illustrated in FIG. 12.

FIG. 12 shows a flow diagram 1200 according to an embodiment.

The flow diagram 1200 illustrates a method for operating a communication device.

In 1201, a message is received from a communication terminal which includes a first radio communication module configured to operate according to a first radio communication technology and a second radio communication module configured to operate according to a second radio communication technology indicating that communication using the second radio communication module is going to be started or has started.

In 1202, in response to the reception of the indication, reception quality measurements of signals received from the first radio communication module are performed if the first radio communication module is transmitting signals to the communication device.

In 1203, it is requested from the communication terminal to perform reception quality measurements of signals received by the first radio communication module if the first radio communication module is receiving signals from the communication device.

Figure 13:
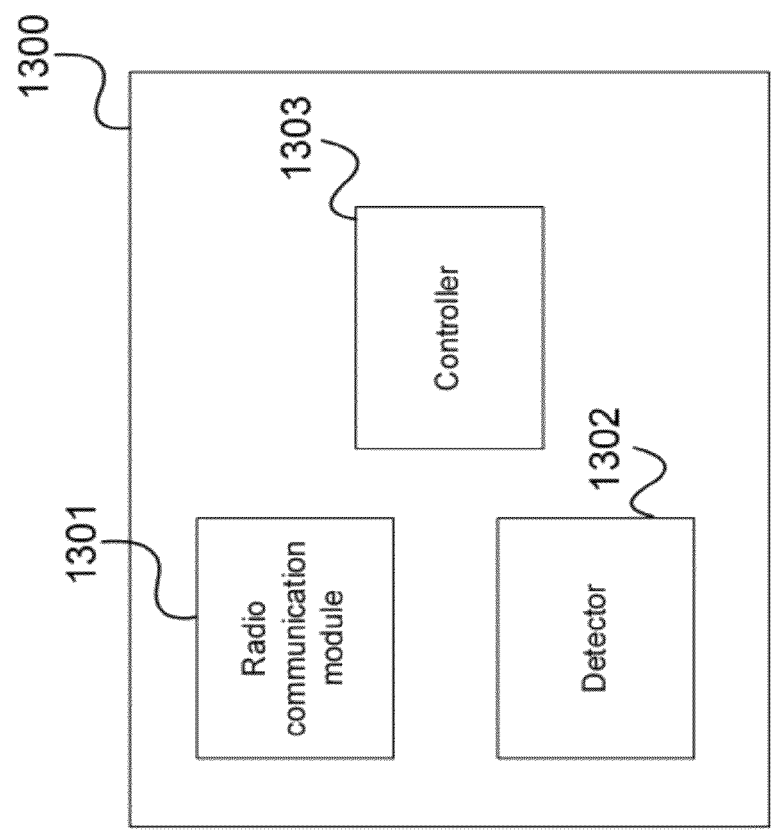
FIG. 13 shows a communication device according to an embodiment.

According to one embodiment, a communication device is provided as illustrated in FIG. 13.

FIG. 13 shows a communication device 1300 according to an embodiment.

The communication device 1300 includes a radio communication module 1301 configured to communicate with another communication device via a communication connection using full duplex frequency division duplexing or half duplex frequency division duplexing.

The communication device 1300 further includes a detector 1302 configured to detect whether the radio communication module 1301 should change the frequency division duplexing mode.

The communication device 1300 further includes a controller 1303 configured to, if it has been detected that the radio communication module should change the frequency division duplexing (FDD) mode, request the radio communication module 1301 to stop communicating according to full duplex frequency division duplexing and to continue communicating with the other communication device via the communication connection using half duplex frequency division duplexing if the radio communication module is communicating with the other communication device via the communication connection using full duplex frequency division duplexing or stop communicating according to half duplex frequency division duplexing and to continue communicating with the other communication device via the communication connection using full duplex frequency division duplexing if the radio communication module is communicating with the other communication device via the communication connection using half duplex frequency division duplexing.

According to one embodiment, in other words, a switch between half-duplex FDD and full-duplex FDD may be carried out for an ongoing communication connection (i.e. during a communication connection) between a communication device and another communication device. In other words, according to an embodiment, during an established communication connection, there may be a switch from half-duplex FDD to full-duplex FDD or vice versa.

The communication device is for example a communication terminal or a base station. Accordingly, the other communication device may be a base station or a communication terminal. For example, according to one embodiment, a base station may switch the frequency duplexing mode for a radio cell it is operating from half-duplex FDD and full-duplex FDD and vice versa.

According to one embodiment (e.g. in which the communication device is a communication terminal), the communication device further includes a receiver configured to receive, if the controller controls the radio communication module to continue communicating with the other communication device via the communication connection using half duplex frequency division duplexing, time domain scheduling information for scheduling data transmission to the other communication device and data reception by the communication device from the other communication device in half-duplex frequency division duplexing and the controller is further configured to control the radio communication module to transmit data to the other communication device and to receive data from the other communication device according to the scheduling information.

According to one embodiment (e.g. in which the communication device is a base station), the communication device further includes a sender configured to send, if the controller controls the radio communication module to continue communicating with the other communication device via the communication connection using half duplex frequency division duplexing, time domain scheduling information for scheduling data transmission from the other communication device to the communication device and data reception by the other communication device from the communication device in half-duplex frequency division duplexing and the controller is further configured to request the other communication device to transmit data to the communication device and to receive data from the communication device according to the scheduling information.

According to one embodiment, the detector is configured to detect that the radio communication module should change the frequency division duplexing mode if a request to change the frequency division duplexing mode is received.

The request is for example received from the other communication device.

According to one embodiment, it is detected that the radio communication module should change the frequency division duplexing mode based on a level of interference of the communication by the radio communication module.

Figure 14:
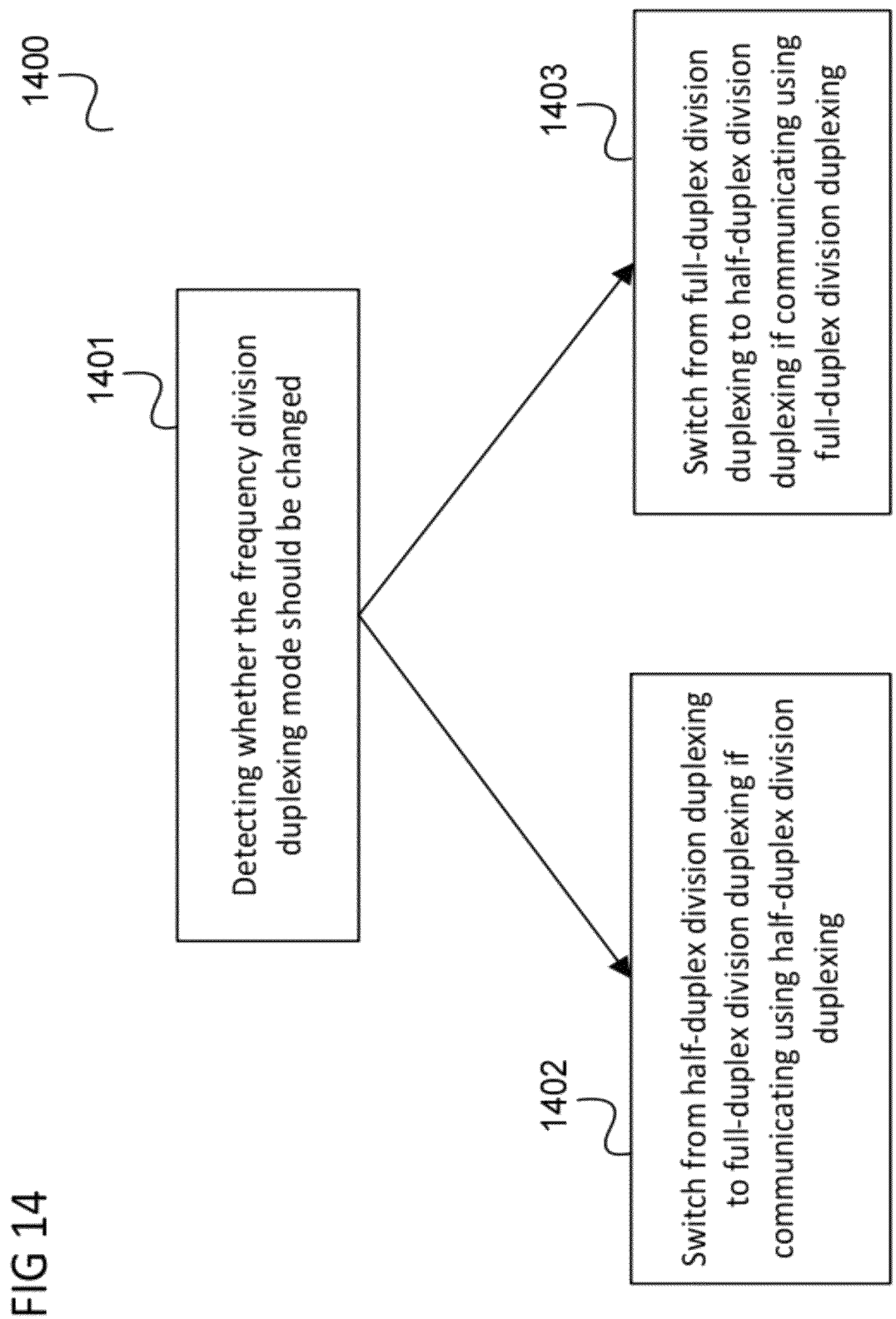
FIG. 14 shows a flow diagram according to an embodiment.

The communication device 1300 for example carries out a method as illustrated in FIG. 14.

FIG. 14 shows a flow diagram 1400 according to an embodiment.

The flow diagram 1400 illustrates a method for operating a communication device including a radio communication module configured to communicate with another communication device via a communication connection using full duplex frequency division duplexing or half duplex frequency division duplexing.

In 1401, it is detected whether the radio communication module should change the frequency division duplexing mode.

In 1402, if it has been detected that the radio communication module should change the frequency division duplexing mode, the radio communication module is requested to stop communicating according to full duplex frequency division duplexing and to continue communicating with the other communication device via the communication connection using half duplex frequency division duplexing if the radio communication module is communicating with the other communication device via the communication connection using full duplex frequency division duplexing In 1403, if it has been detected that the radio communication module should change the frequency division duplexing mode, the radio communication module is requested to stop communicating according to half duplex frequency division duplexing and to continue communicating with the other communication device via the communication connection using full duplex frequency division duplexing if the radio communication module is communicating with the other communication device via the communication connection using half duplex frequency division duplexing.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

According to one embodiment, a controller performing a measurement or requesting a measurement may for example include the controller controlling one or more communication device/terminal components (e.g. circuits) to carry out the respective task.

In the embodiments described in the following, it is assumed that a communication terminal is operating in a mobile communication network according to LTE-Advanced (LTE-A) based on OFDMA/TDMA in downlink, SC-FDMA/TDMA in uplink and using FDD mode. The communication terminal (which is a mobile terminal in the following embodiments) is assumed to be equipped with a first radio communication module configured for LTE-A radio communication and a second radio communication module configured for WLAN or Bluetooth communication (or also e.g. reception of GPS signals). Generally, the second radio communication module (e.g. of the communication terminal 900 described with reference to FIG. 9) is configured to operate according to a radio technology using an unlicensed frequency region (such as ISM) while the first radio communication module is configured to operate using a licensed frequency region (such as a frequency region of a mobile communication network). In the following embodiments, it is further assumed that the communication terminal is in LTE-A RRC_CONNECTED state and is (initially) operated in full-duplex FDD mode.

In the following, an embodiment for interference detection and avoidance for interference scenario 1 in table 1, i.e. the mobile terminal 105 receives according to LTE-A radio, e.g. from a base station 103, and transmits according to ISM radio, is described with reference to FIGS. 15 and 16.

Figure 15:
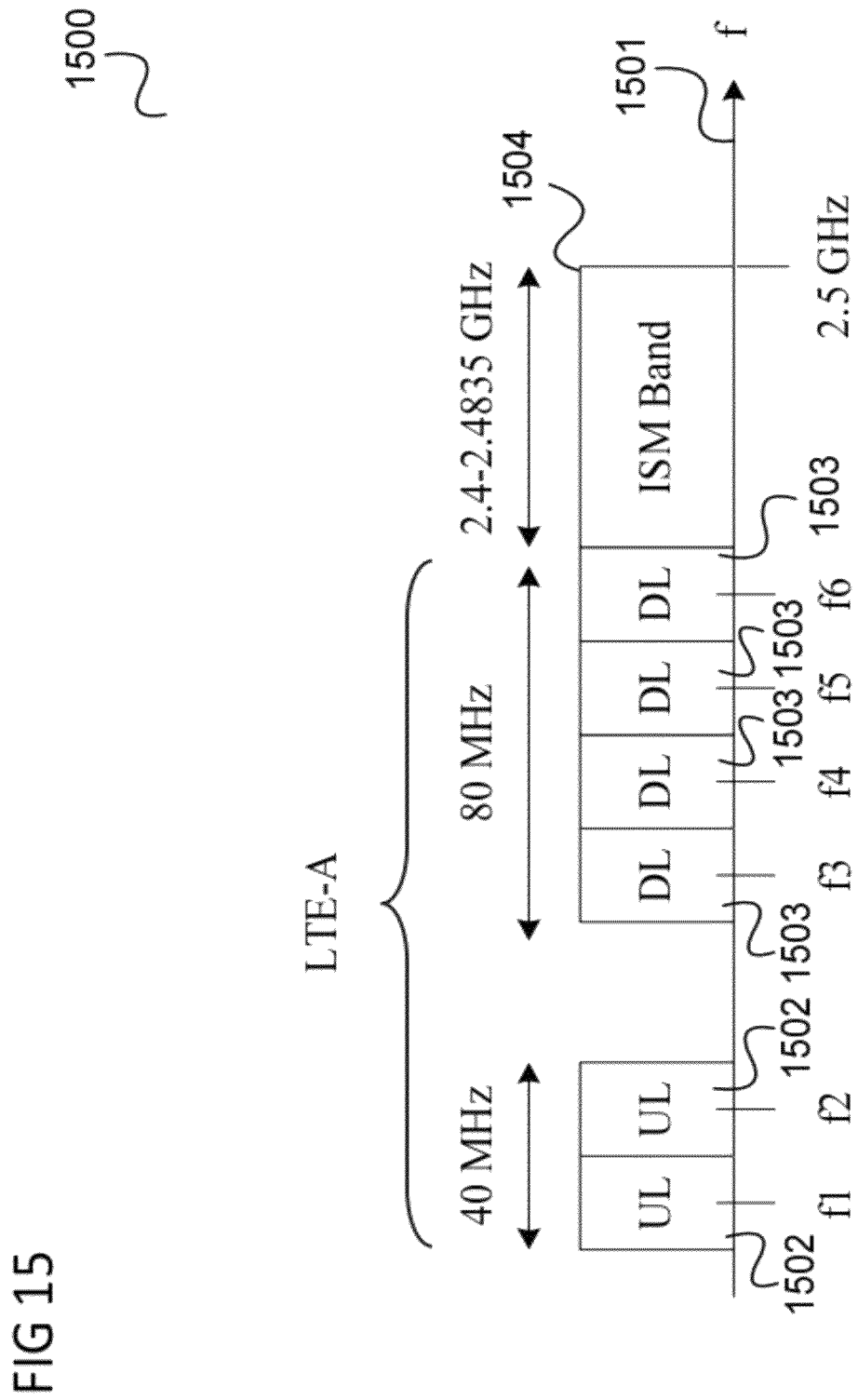
FIG. 15 shows a frequency allocation diagram.

FIG. 15 shows a frequency allocation diagram 1500.

In the frequency allocation diagram 1500, frequency increases along a frequency axis 1501. In this example, two adjacent first component carriers 1502 (characterized by carrier frequencies f1 and f2) are allocated for LTE-A uplink transmission, and four adjacent second component carriers (characterized by carrier frequencies f3 to f6) 1503 which are adjacent to ISM band 1504 are allocated for LTE-A downlink transmission.

It is assumed that the uplink component carrier 1502 characterized by the carrier frequency f1 is associated with the downlink component carrier 1503 characterized by the carrier frequency f5, and uplink component carrier 1502 characterized by the carrier frequency f2 is associated with the downlink component carrier 1503 characterized by the carrier frequency f6.

Generally, according to one embodiment, for interference scenario 1 in table 1 (reception according to LTE-A radio, transmission according to ISM radio) the following may be carried out for interference detection.

The mobile terminal 105 may send to the base station 103 an ISM activated message indicating the activation of ISM radio in the mobile terminal 105. The message is transmitted as a physical layer message on the uplink component carrier associated to the downlink component carrier adjacent to the ISM band. Physical channels for carrying the physical layer message are for example PUCCH and PUSCH.

In order to obtain detailed interference detection on a specific downlink component carrier the base station 103 may send to the mobile terminal 105 a DL TX Quality Report Request message requesting the status/history of radio link quality of received downlink transmissions on PDSCH on a specific downlink component carrier.

The mobile terminal 105 generates a DL TX Quality Report Response message based on a measurement configuration received from the base station, e.g. in accordance to
- a periodic reporting period with a value range of e.g. [50, 100, 200, . . . ] in ms
- a reference measurement period with a value range of, e.g. [1, 10, . . . ] in ms
- a reference frequency resource (for which the measurements are carried out) with a value range of, e.g. [4, 8, 10, . . . ] in a number of physical resource blocks
- a measurement of the demodulation reference signal transmitted on PDSCH
- a downlink radio link quality threshold $Q_{DL}$
- a report setting:
    - "1": if the radio link quality of measured demodulation reference signal in the reference frequency resource and over the reference measurement period is above the threshold $Q_{DL}$
    - "0": if the radio link quality of measured demodulation reference signal in the reference frequency resource and over the reference measurement period is below the threshold $Q_{DL}$ The values of the above parameters, i.e. the configuration for compiling the DL TX Quality Report Response message such as the reporting period or a specification of the physical resource blocks for which measurements are to be carried out may be transmitted on RRC layer, e.g. as part of the DL TX Quality Report Request message or in a separate Measurement Control message. Further, the DL TX Quality Report Request message and the DL TX Quality Report Response message may be transmitted either as a physical layer message or as an RRC message. The physical layer messages are for example carried by the physical channels PUCCH and PUSCH in uplink and PDCCH, PDSCH in downlink.

Figure 16:
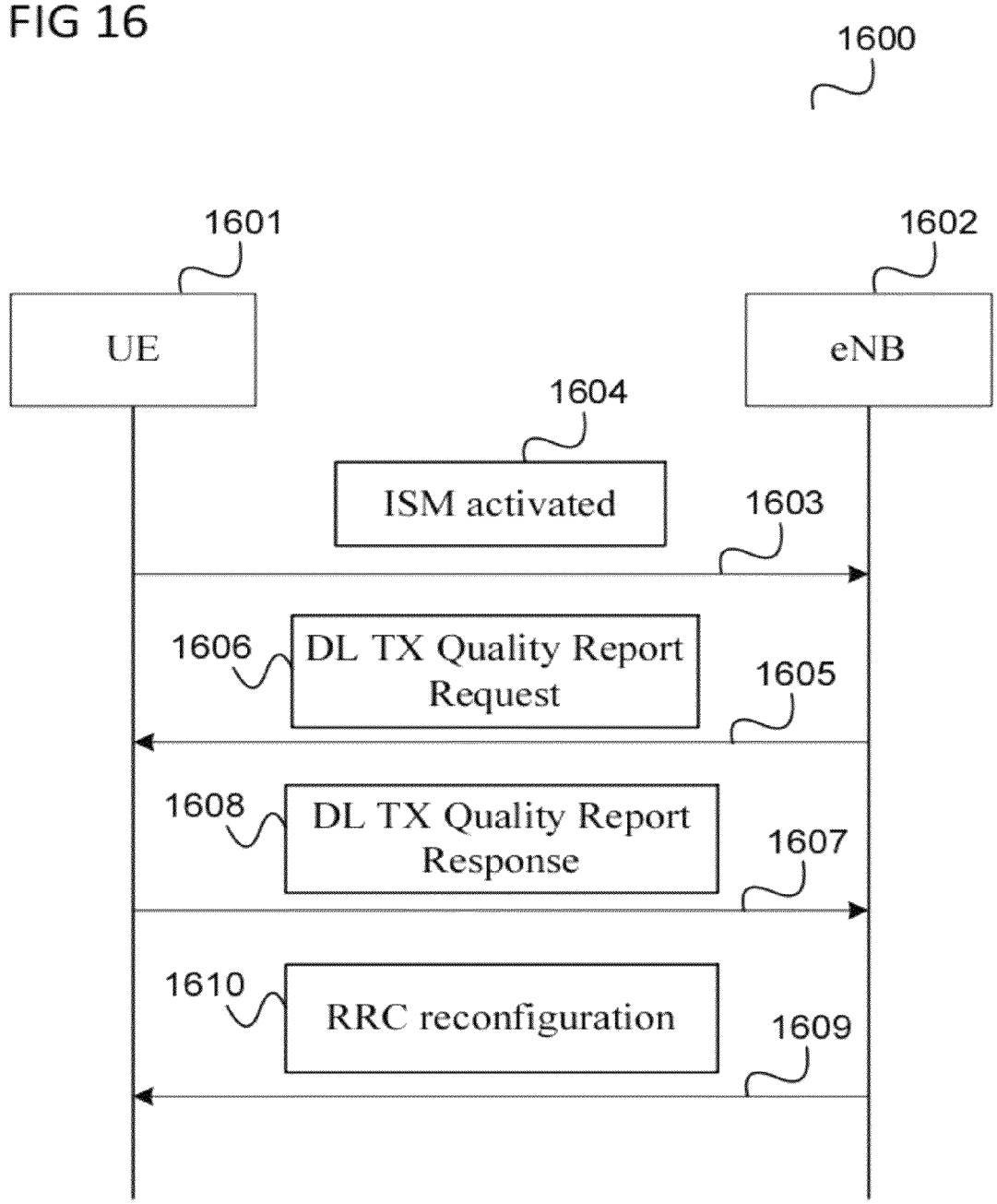
FIG. 16 shows a message flow diagram according to an embodiment.

A message exchange for example carried out in case of the frequency allocation as illustrated in FIG. 15 is shown in FIG. 16.

FIG. 16 shows a message flow diagram 1600 according to an embodiment.

The message flow takes place between a mobile terminal 1601 (for example corresponding to the mobile terminal 105) and a base station 1602 (for example corresponding to the base station 103 operating the radio cell 104 in which the mobile terminal 1601 is located).

It is assumed that the mobile terminal 1601 includes a WLAN module that is activated, e.g. in response to a communication request from a higher layer (e.g. the user for the mobile terminal 1601 initiates WLAN communication using an application running on the mobile terminal 1601).

In 1603, once the WLAN module has been activated (or, for example, in response to the communication request using the WLAN module, i.e. possibly simultaneously with the activation of the WLAN module or shortly before its activation) the mobile terminal 1601 sends to base station 1602 an ISM activated message 1604 indicating the activation of ISM radio in the mobile terminal 1601. The message 1604 is transmitted as physical layer message on PUCCH and on the uplink component carrier 1502 characterized by frequency f2 associated to the downlink component carrier 1503 characterized by frequency f6 adjacent to the ISM band 1504.

In 1605, for detailed interference detection on downlink component carrier 1503 characterized by frequency f6 base station 1602 sends to the mobile terminal 1601 a DL TX Quality Report Request message 1606 via RRC requesting the status/history of radio link quality of received downlink transmissions on PDSCH on the downlink component carrier 1503 characterized by frequency f6. Further, the base station 1602 sends to the mobile terminal 1601 the following configuration for generating a DL TX Quality Report Response message 1608 via RRC as part of the DL TX Quality Report Request message 1606:
- Periodic reporting period with a value of 400 ms
- Reference measurement period with a value of 10 ms
- Reference frequency resource with a value of 16 PRBs (physical resource blocks) adjacent to the ISM band 1504 (i.e. a bandwidth corresponding to 16 physical resource blocks adjacent to the ISM band)
- Measurement of the demodulation reference signal transmitted on PDSCH
- Downlink radio link quality threshold $Q_{DL}$ The mobile terminal 1601 generates the DL TX Quality Report Response message 1608 according to the received configuration and in 1607 sends the response message 1608 via RRC every 400 ms to the base station 1602. In the response message 1608 the mobile terminal 1601 reports the radio link quality of received downlink transmissions on PDSCH on the downlink component carrier f6 according to the following settings:
- setting "1": if the radio link quality of measured DM RS in the reference frequency resource and over the reference measurement period is above the threshold $Q_{DL}$
- setting "0": if the radio link quality of measured DM RS in the reference frequency resource and over the reference measurement period is below the threshold $Q_{DL}$ For interference avoidance in interference scenario 1, generally the following may be carried out according to an embodiment.

If the base station 103 determines based on a DL TX Quality Report Response message received from the mobile terminal 105 that parallel ISM radio transmissions cause significant interference to reception on a specific downlink component carrier then the base station 103 may decide to avoid allocation of the downlink component carrier for communication with the mobile terminal 105.

Alternatively, the base station 103 may send to the mobile terminal 105 a message as follows according to one embodiment:
- In case of FDD and small bandwidth size of the component carrier the base station 103 may send an RRC message requesting the mobile terminal 105
    - to switch the associated uplink/downlink component carrier pair (including the component carrier for which interference was detected) from full-duplex FDD to half-duplex FDD and/or requesting the mobile terminal 105
  to apply for the associated uplink/downlink component carrier pair a certain uplink-downlink configuration in time-domain
In case of TDD and small bandwidth size of the component carrier the base station 103 may send an RRC message requesting the mobile terminal 105
  to apply for the component carrier a certain uplink-downlink configuration in time-domain In table 2, exemplary uplink-downlink configurations for half-duplex FDD mode operation are shown. The length of each uplink-downlink configuration is 10 subframes (from left to right in table 2) in this example. Each uplink-downlink configuration includes subframes to be used for uplink (UL), subframes to be used for downlink (DL) as well as Guard Subframes (GS) where no transmissions take place and which are used as period for switching between uplink and downlink transmissions.

TABLE 2

Half-duplex FDD UL-DL configurations in time-domain

| Configuration | #0 | #1 | #2 | #3 | #4 | #5 | #6 | #7 | #8 | #9 |
|---|---|---|---|---|---|---|---|---|---|---|
| 1 | DL | DL | DL | GS | UL | UL | UL | GS | DL | DL |
| 2 | GS | DL | DL | DL | GS | UL | UL | UL | UL | UL |
| 3 | UL | GS | DL | DL | DL | GS | UL | UL | UL | UL |
| 4 | UL | UL | GS | DL | DL | DL | GS | UL | UL | UL |
| 5 | UL | UL | UL | GS | DL | DL | DL | GS | UL | UL |
| 6 | GS | UL | UL | UL | GS | DL | DL | DL | DL | DL |
| 7 | DL | GS | UL | UL | UL | GS | DL | DL | DL | DL |
| 8 | DL | DL | GS | UL | UL | UL | GS | DL | DL | DL |

For example, in the example described above with reference to FIGS. 15 and 16 it is assumed that the base station 1602 determines based on the DL TX Quality Report Response message 1608 received from the mobile terminal 1601 that parallel ISM radio transmissions cause significant interference to the reception of the 16 physical resource blocks adjacent to the ISM band. To avoid this interference the base station 1602 decides not to schedule the 16 physical resource blocks adjacent to the ISM band for PDSCH transmissions to the mobile terminal 1601 as long as its ISM radio is active, i.e. to not allocate the 16 physical resource blocks adjacent to the ISM band.

As second example, it is assumed that the frequency allocation is as shown in FIG. 15 with the difference that the bandwidths of the component carrier characterized by frequency f2 and the component carrier characterized by frequency f6 are assumed to be 5 MHz instead of 20 MHz (the bandwidth of the other component carriers is still assumed to be 20 MHz).

It is further assumed that the DL TX Quality Report Request message 1606 specifies that the reference frequency resource (i.e. the frequency region for which measurements are to be carried out) includes eight physical resource blocks adjacent to the ISM band 1504.

It is further assumed that the base station 1602 determines based on the DL TX Quality Report Response 1608 received from the mobile terminal 1601 that parallel ISM radio transmissions cause significant interference to the reception of data transmitted using the 8 physical resource blocks adjacent to the ISM band 1504. As the bandwidth of downlink component carrier f6 is small and to avoid further interference the base station 1602 decides to switch the mobile terminal 1601 from full-duplex FDD to half-duplex FDD for the uplink/downlink component carrier pair f2/f6.

For this, in 1609 the base station 1602 sends an RRC reconfiguration message 1610 including the switch command and the specification of uplink-downlink configuration #3 in table 2 to be applied in time-domain. Uplink-downlink configuration number 3 (fourth row of table 2) for half-duplex FDD mode operation consists of 3 downlink subframes, 5 uplink subframes and 2 guard subframes within a 10 ms radio frame.

In the following, an embodiment for interference detection and avoidance for interference scenario 4 in table 1, i.e. the mobile terminal 105 transmits according to LTE-A radio, e.g. to a base station 103, and transmits according to ISM radio, is described with reference to FIGS. 17 and 18.

Figure 17:
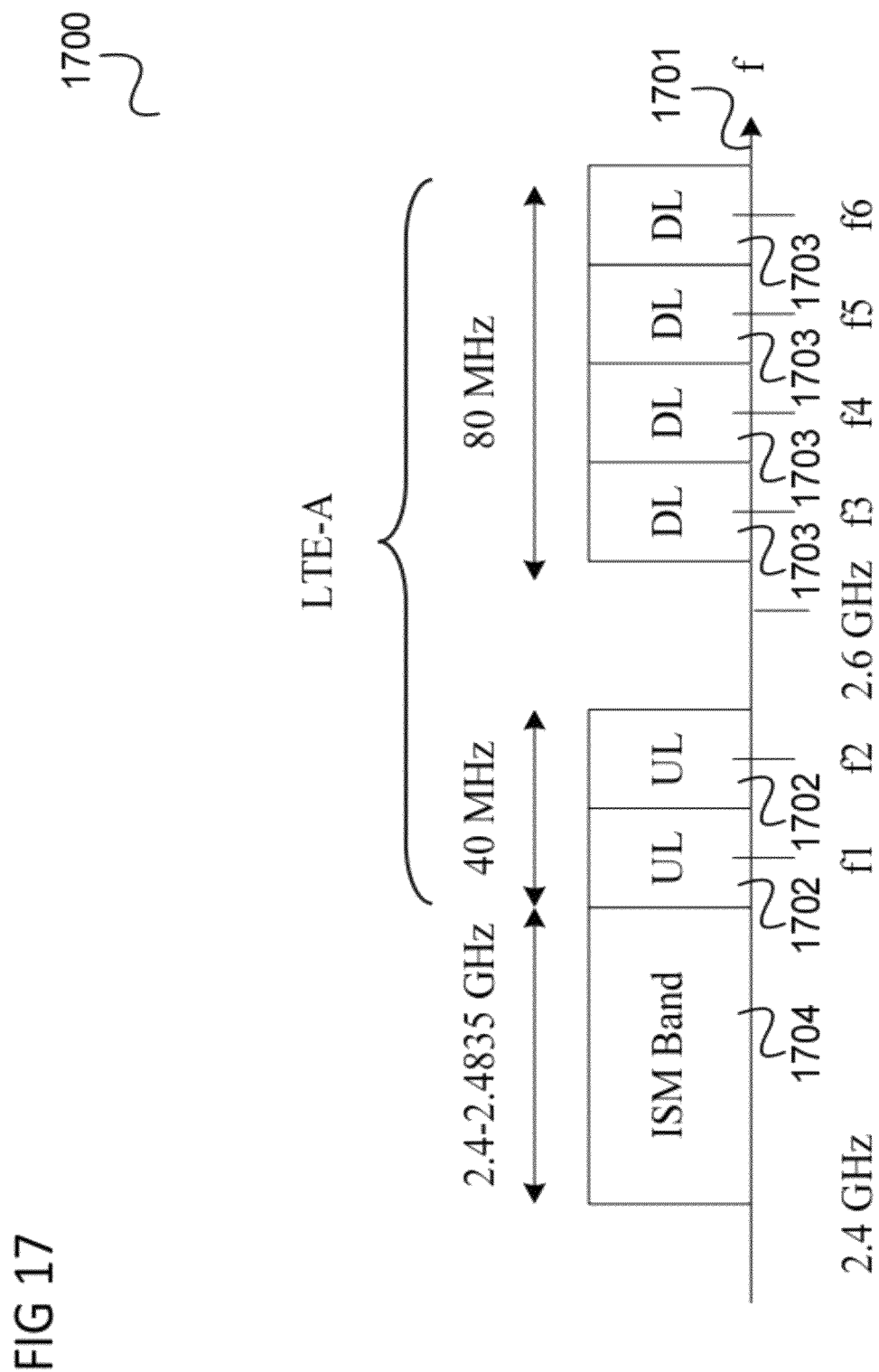
FIG. 17 shows a frequency allocation diagram.

FIG. 17 shows a frequency allocation diagram 1700.

In the frequency allocation diagram 1700, frequency increases along a frequency axis 1701. In this example, two adjacent first component carriers 1702 (characterized by carrier frequencies f1 and f2) which are adjacent to ISM band 1704 are allocated for LTE-A uplink transmission, and four adjacent second component carriers (characterized by carrier frequencies f3 to f6) 1703 are allocated for LTE-A downlink transmission.

It is assumed that the uplink component carrier 1702 characterized by the carrier frequency f1 is associated with the downlink component carrier 1703 characterized by the carrier frequency f5, and uplink component carrier 1702 characterized by the carrier frequency f2 is associated with the downlink component carrier 1703 characterized by the carrier frequency f6.

For example, the mobile terminal 105 is an LTE-A UE and is located in a femto cell whose coverage is provided by a Home eNB.

Generally, according to one embodiment, for interference scenario 4 in table 1 (transmission according to LTE-A radio, transmission according to ISM radio) the following may be carried out for interference detection.

The mobile terminal 105 may send to the base station 103 an ISM activated message indicating the activation of ISM radio in the mobile terminal 105 (e.g. of an ISM radio module). The ISM activated message may for example be transmitted as a physical layer message on the uplink component carrier adjacent to the ISM band. The ISM activated message may for example be transmitted using PUCCH and PUSCH.

In order to obtain detailed interference detection on a specific uplink component carrier the mobile terminal 105 may send to the base station 103 an UL TX Quality Report Request message requesting the status/history of radio link quality of received uplink transmissions on PUCCH, PUSCH on a specific uplink component carrier. The base station 103 performs measurements and generates an UL TX Quality Report Response message based on a measurement configuration, e.g. according to a periodic reporting period with a value range of, e.g. [50, 100, 200, . . . ] in ms
  a reference measurement period with value range of, e.g. [1, 10, . . . ] in ms
  a reference frequency resource with a value range of, e.g. [4, 8, 10, . . . ] in physical resource blocks
  a measurement of the demodulation reference signal transmitted on PUCCH, PUSCH
  an uplink radio link quality threshold $Q_{UL}$
  a report setting:
    "1": if the radio link quality of the measured demodulation reference signal within the reference frequency resource and over the reference measurement period is above the threshold $Q_{UL}$ "0": if the radio link quality of the measured demodulation reference signal within the reference frequency resource and over the reference measurement period is below the threshold $Q_{UL}$ The configuration for performing the measurements and generating the UL TX Quality Report Response message may be transmitted via RRC from the mobile terminal 105 to the base station 103, e.g. as part of the UL TX Quality Report Request message or in a separate Measurement Control message.

The UL TX Quality Report Request message and the UL TX Quality Report Response message may be transmitted either as a physical layer message or an RRC message. For transmitting it as a physical layer message the PUCCH and PUSCH may for example be used in uplink and PDCCH, PDSCH may for example be used in downlink.

Figure 18:
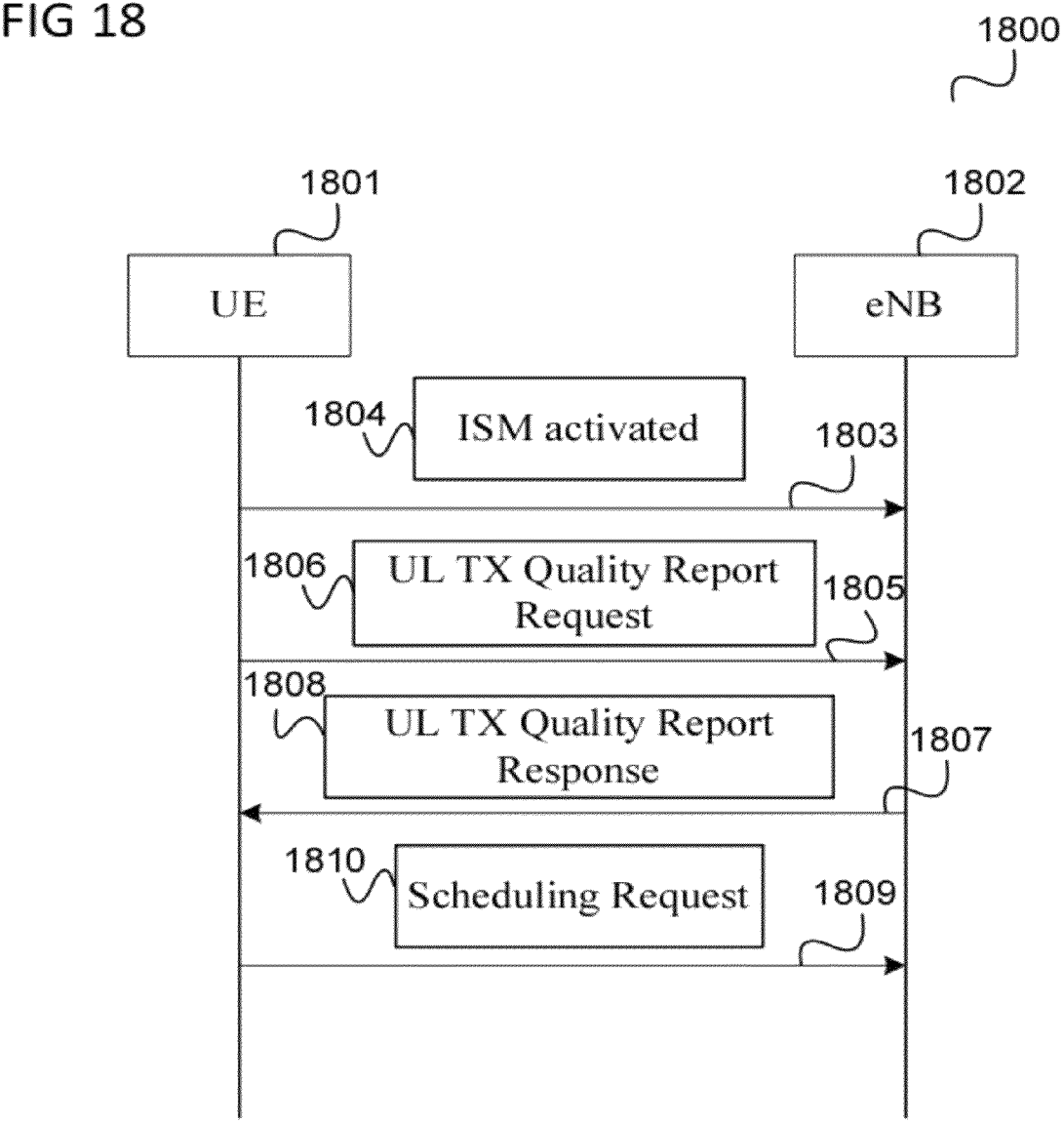
FIG. 18 shows a message flow diagram according to an embodiment.

A message exchange for example carried out in case of the frequency allocation as illustrated in FIG. 17 is shown in FIG. 18.

FIG. 18 shows a message flow diagram 1800 according to an embodiment.

The message flow takes place between a mobile terminal 1801 (for example corresponding to the mobile terminal 105) and a base station (for example corresponding to the base station 103 operating the radio cell 104 in which the mobile terminal 1801 is located).

In 1803, once the WLAN module (or more generally ISM radio) has been activated, the mobile terminal 1801 sends to base station 1802 an ISM activated message 1804 indicating the activation of ISM radio in the mobile terminal 1801. The ISM activated message 1804 is transmitted as physical layer message on PUCCH and on the uplink component carrier characterized by frequency f1 adjacent to the ISM band 1704.

For detailed interference detection on the uplink component carrier f1 the mobile terminal 1801 in 1805 sends to the base station 1802 an UL TX Quality Report Request message 1806 via RRC requesting the status and/or history of radio link quality of received uplink transmissions on PUCCH, PUSCH on the uplink component carrier characterized by frequency f1. In this example, the mobile terminal 1801 sends to the base station 1802 the following configuration for generating an UL TX Quality Report Response message 1808 via RRC as part of the UL TX Quality Report Request message 1806:

Periodic reporting period with a value of 400 ms
Reference measurement period with a value of 10 ms
Reference frequency resource with a value of 16 physical resource blocks adjacent to the ISM band
Measurement of the demodulation reference signal transmitted on PUCCH, PUSCH
Uplink radio link quality threshold $Q_{UL}$ The base station 103 generates the UL TX Quality Report Response message 1808 according to the received configuration and in 1807 sends the response message 1808 via RRC every 400 ms to the mobile terminal 1801. In the response message 1808 the base station 1802 reports the radio link quality of received uplink transmissions on PUCCH, PUSCH on the uplink component carrier f1 using the following settings:

"1": if the radio link quality of the measured demodulation reference signals in the reference frequency resource and over the reference measurement period is above the threshold $Q_{UL}$
"0": if the radio link quality of measured demodulation reference signals in the reference frequency resource and over the reference measurement period is below the threshold $Q_{UL}$ Generally, according to one embodiment, for interference scenario 4 in table 1 (transmission according to LTE-A radio, transmission according to ISM radio) the following may be carried out for interference avoidance.

If the mobile terminal 105 determines based on the UL TX Quality Report Response received from the base station 103 that parallel ISM radio transmission causes significant interference to transmission on a specific uplink component carrier then, according to one embodiment, the mobile terminal 105 may send to the base station 103 a message according to the following:

In case of FDD and small bandwidth size of the component carrier the mobile terminal 105 may send an RRC message requesting the base station 103
to switch from full-duplex FDD to half-duplex FDD for the uplink/downlink component carrier pair including the uplink component carrier for which interference is detected and its associated downlink component carrier and/or
requesting the base station 103
to apply a certain uplink-downlink configuration in time-domain
In case of TDD and small bandwidth size of the component carrier the mobile terminal 105 may send an RRC message requesting the base station 103
to apply a certain uplink-downlink configuration in time-domain for the component carrier
In case of FDD/TDD and large bandwidth size of the uplink component carrier the mobile terminal may send a Scheduling Request message (of size N bits) indicating physical resources to be used by the base station 103 for scheduling of PUCCH, PUSCH transmission. Alternatively, the Scheduling Request message may be used to indicate physical resources not to be used by the base station 103 for scheduling of PUCCH, PUSCH transmission. The Scheduling Request message may be transmitted either as a physical layer or as an RRC message. As physical layer message, the Scheduling Request message may for example be transmitted using PUCCH and PUSCH.

For example, it is assumed that the mobile terminal 1801 determines based on the UL TX Quality Report Response message 1808 received from the base station 1802 that parallel ISM radio transmissions cause significant interference to the transmission of the 16 physical resource blocks adjacent to the ISM band. To avoid this interference the mobile terminal 1801 sends in 1809 to the base station 1802 a Scheduling Request message 1810 via RRC indicating that the 16 physical resource blocks adjacent to the ISM band should not be used for scheduling of PUCCH, PUSCH as long as the mobile terminal's ISM radio module is active.

According to an embodiment, as described above, a communication terminal 900 may perform downlink measurements or request a communication device to perform uplink measurements. As described above, this is according to an embodiment carried out in response to the reception of a request for starting communication using the second radio communication module 902. Such a request for starting communication may for example be an activation signal for the second radio communication module 902 resulting in a change of state of the second radio communication module. This is illustrated in FIG. 19.

Figure 19:
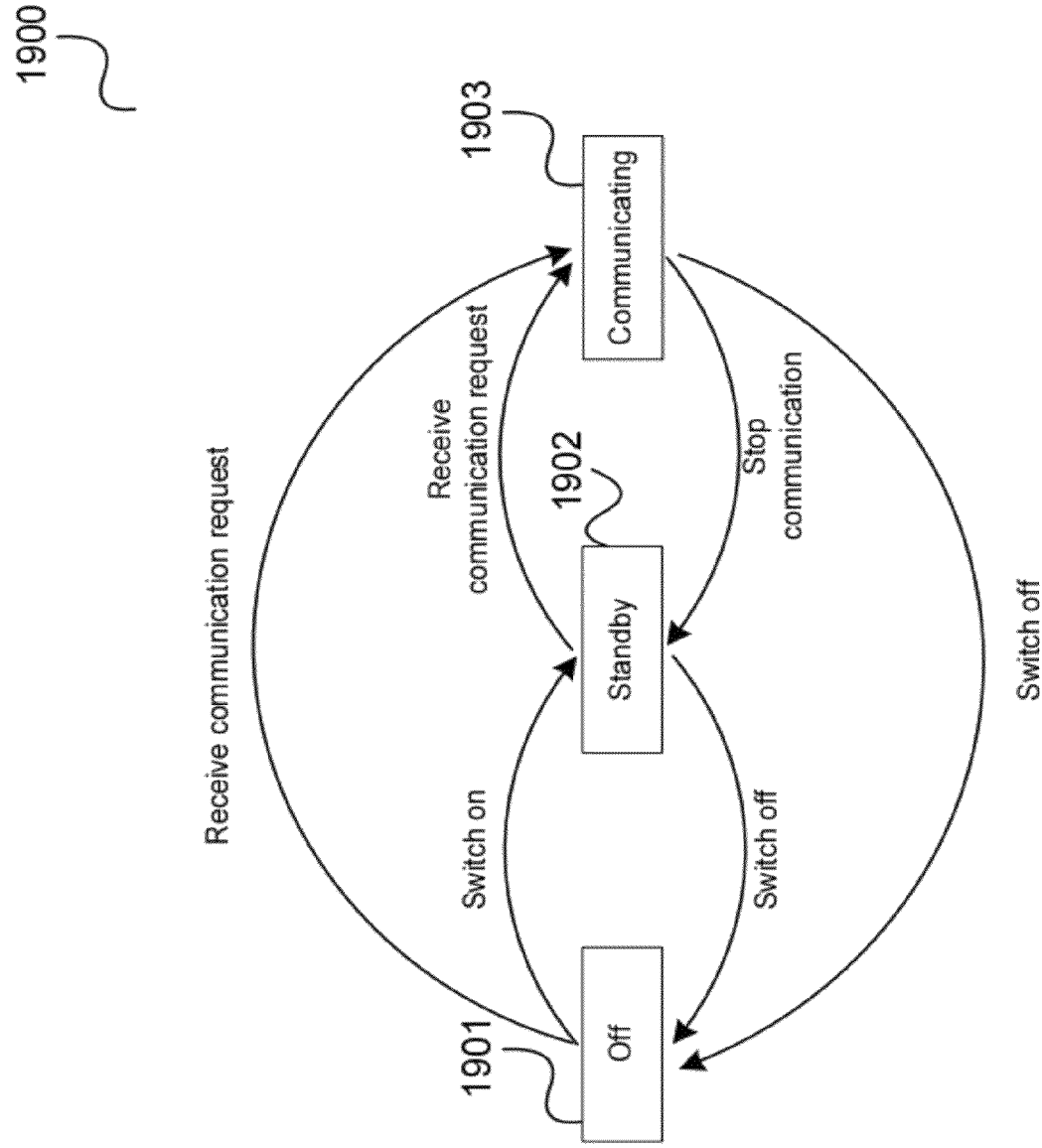
FIG. 19 shows a state diagram of a radio communication module according to an embodiment.

FIG. 19 shows a state diagram 1900 of a radio communication module according to an embodiment.

The state diagram 1900 illustrates states of the second radio communication module 902. It includes an off state 1901, in which the second radio communication module 902 is switched off (e.g. is not supplied with power), a standby state 1902, in which the second radio communication module 902 is in standby (e.g. is ready to start communication) and a communication state 1903 in which the second radio communication module 902 is actively communicating, i.e. receiving and/or transmitting data. The communication state 1902 can be seen as an active state of the second radio communication module 902 while the off state 1901 and/or the standby state 1902 can be seen as a deactivated state of the second radio communication module.

In this example, the second radio communication module 902 switches from the off state 1901 and the standby state 1902 to the communication state 1903 upon reception of a request for communication (i.e. a request to carry out communication) e.g. received from a higher communication layer, e.g. according to a user input. The state transitions from the off state 1901 to the communication state 1903 or from the standby state 1902 to the communication state 1903 may be seen as an activation of the second radio communication module 902. Accordingly, the reception of the request for communication may be seen as an activation of the second radio communication module 902 by another component of the communication terminal 902 (e.g. by controller 903).

The second radio communication module 902 may return to off state 1901 by being switched off or may return to standby state 1902 when communication is stopped (e.g. upon reception of a request to stop communication).

The second radio communication module 902 may also change from off state 1901 to standby state 1902 when it is switched on but communication is not yet started.

It should be noted that according to one embodiment, upon receipt of a communication request, the second radio communication module 902 may first change into standby state 1902 until communication is actually started. For example, the second radio communication module 902 switches to standby state 1902 and waits for data to be transmitted until it actually starts communication and enters communication state 1903. In this regard, the reception of a request for communication may also be seen as a request to get ready for communication which may already trigger the performing of measurements or the request for the communication device to perform measurements.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication terminal comprising:
a first radio communication module configured to operate according to a first radio communication technology;
a second radio communication module configured to operate according to a second radio communication technology;
a controller configured to, in response to the reception of a request for starting communication using the second radio communication module, perform at least one of requesting from a communication device to perform reception quality measurements of signals received from the first radio communication module if the first radio communication module is transmitting signals to the communication device; and
performing reception quality measurements of signals received from the communication device by the first radio communication module if the first radio communication module is receiving signals from the communication device;
wherein the controller is further configured to initiate a controlling action based on the result of the measurements, wherein the controlling action is a reconfiguration of the first radio communication module.

2. The communication terminal according to claim 1, wherein the reception of the request for starting communication using the second radio communication module is the reception of an activation signal for the second radio communication module.

3. The communication terminal according to claim 1, wherein the controller is further configured to activate the second radio communication module in response to the reception of the request for starting communication using the second radio communication module.

4. The communication terminal according to claim 1, wherein the controller configured is configured to perform at least one of requesting from the communication device to perform the reception quality measurements and performing the reception quality measurements after the requested communication using the second radio communication module has been started.

5. The communication terminal according to claim 1, wherein the communication terminal further comprises a signaling circuit and the controller is further configured to control, in response to the reception of the request to start communication using the second radio communication module, the signaling circuit to signal to the communication device that communication using the second radio communication module is going to be started or has started.

6. The communication terminal according to claim 1, wherein the reception quality measurements are measurements of interference to the communication by the first radio communication module caused by the second radio communication module.

7. The communication terminal according to claim 1, wherein the reconfiguration comprises a reconfiguration of communication resources to be used by the first radio communication module.

8. The communication terminal according to claim 1, wherein the reconfiguration comprises a reconfiguration of a duplexing mode used by the first radio communication module.

9. The communication terminal according to claim 8, wherein the reconfiguration comprises a switch from half-duplex frequency division duplexing to full-duplex frequency division duplexing or from full-duplex frequency division duplexing to half-duplex frequency division duplexing.

10. The communication terminal according to claim 9, further comprising a receiver configured to receive time domain scheduling information for scheduling data transmission to the communication device and data reception from the communication device in half-duplex frequency division duplexing and wherein the controller is further configured to control the first radio communication module to transmit data to the communication device and to receive data from the communication device according to the scheduling information.

11. The communication terminal according to claim 1, wherein the request to the communication device comprises measurement parameters according to which the reception quality measurements of signals received from the first radio communication module are to be performed.

12. The communication terminal according to claim 1, wherein the controller is configured to signal, in response to the reception of a request for starting communication using the second radio communication module, to the communication device that communication using the second radio communication module is going to be started or has started, wherein the communication terminal further comprises a receiver and wherein the controller is configured to perform reception quality measurements of signals received from the communication device by the first radio communication module if the first radio communication module is receiving signals from the communication device upon reception of a request from the communication device to perform reception quality measurements of signals received from the communication device by the first radio communication module.

13. The communication terminal according to claim 1, wherein the request from the communication device comprises measurement parameters according to which the reception quality measurements of signals received from the communication device by the first radio communication module are to be performed.

14. The communication terminal according to claim 1, wherein the controller is configured to, in response to the reception of a request for starting communication using the second radio communication module, perform both of
　　requesting from a communication device to perform reception quality measurements of signals received from the first radio communication module; and
　　performing reception quality measurements of signals received from the communication device by the first radio communication module
　　if the first radio communication module is transmitting signals to the communication device and receiving signals from the communication device.

15. The communication terminal according to claim 1, wherein the communication device is a base station.

16. A method for operating a communication terminal comprising a first radio communication module configured to operate according to a first radio communication technology and comprising a second radio communication module configured to operate according to a second radio communication technology, the method comprising:
　　in response to the reception of a request for starting communication using the second radio communication module, perform at least one of
　　　requesting from a communication device to perform reception quality measurements of signals received from the first radio communication module if the first radio communication module is transmitting signals to the communication device; and
　　　performing reception quality measurements of signals received from the communication device by the first radio communication module if the first radio communication module is receiving signals from the communication device;
initiating a controlling action based on the result of the measurements, wherein the controlling action is a reconfiguration of the first radio communication module.

17. A communication device comprising:
　　a receiver configured to receive from a communication terminal which comprises a first radio communication module configured to operate according to a first radio communication technology and a second radio communication module configured to operate according to a second radio communication technology a message indicating that communication using the second radio communication module is going to be started or has started;
　　a controller configured to, in response to the reception of the indication, perform at least one of
　　　performing reception quality measurements of signals received from the first radio communication module if the first radio communication module is transmitting signals to the communication device; and
　　　requesting from the communication terminal to perform reception quality measurements of signals received by the first radio communication module if the first radio communication module is receiving signals from the communication device:
wherein the controller is further configured to initiate a controlling action based on the result of the measurements, wherein the controlling action is a reconfiguration of the first radio communication module.

18. A method for operating a communication device comprising:
　　receiving from a communication terminal which comprises a first radio communication module configured to operate according to a first radio communication technology and a second radio communication module configured to operate according to a second radio communication technology a message indicating that communication using the second radio communication module is going to be started or has started;
　　in response to the reception of the indication, performing at least one of
　　　performing reception quality measurements of signals received from the first radio communication module if the first radio communication module is transmitting signals to the communication device; and
　　　requesting from the communication terminal to perform reception quality measurements of signals received by the first radio communication module if the first radio communication module is receiving signals from the communication device;
initiating a controlling action based on the result of the measurements, where the controlling action is a reconfiguration of the first radio communication module.

* * * * *